US008255697B2

(12) United States Patent
Mathiassen et al.

(10) Patent No.: US 8,255,697 B2
(45) Date of Patent: Aug. 28, 2012

(54) PORTABLE OR EMBEDDED ACCESS AND INPUT DEVICES AND METHODS FOR GIVING ACCESS TO ACCESS LIMITED DEVICES, APPARATUSES, APPLIANCES, SYSTEMS OR NETWORKS

(75) Inventors: Svein Mathiassen, Heggedal (NO); Ivar Mathiassen, Narvik (NO)

(73) Assignee: Bware AS, Asker (NO)

( * ) Notice: Subject to any disclaimer, the term of this patent is extended or adjusted under 35 U.S.C. 154(b) by 444 days.

(21) Appl. No.: 11/966,531

(22) Filed: Dec. 28, 2007

(65) Prior Publication Data
US 2009/0010503 A1 Jan. 8, 2009

Related U.S. Application Data

(63) Continuation of application No. 10/321,850, filed on Dec. 18, 2002, now abandoned.

(51) Int. Cl.
*G06F 21/00* (2006.01)
*G06K 9/00* (2006.01)
*G06F 7/04* (2006.01)

(52) U.S. Cl. ............... 713/186; 382/124; 726/6; 726/9; 726/20; 713/182

(58) Field of Classification Search .................. None
See application file for complete search history.

(56) References Cited

U.S. PATENT DOCUMENTS

| 1,177,984 | A | 4/1916 | Beene |
| 2,742,259 | A | 4/1956 | Boucher |
| 2,871,946 | A | 2/1959 | Bigelow |
| 3,405,772 | A | 10/1968 | Wisenbaker et al. |
| 3,670,566 | A | 6/1972 | Basham et al. |
| 3,827,512 | A | 8/1974 | Edmond |
| 3,862,359 | A | 1/1975 | McCullough et al. |
| 3,890,905 | A | 6/1975 | Clavin |
| 3,926,267 | A | 12/1975 | Svirschevsky et al. |
| 4,031,750 | A | 6/1977 | Youmans et al. |
| 4,050,384 | A | 9/1977 | Chapman |
| 4,071,086 | A | 1/1978 | Bennett |
| 4,095,655 | A | 6/1978 | Still |
| 4,112,850 | A | 9/1978 | Sigel-Gfeller |

(Continued)

FOREIGN PATENT DOCUMENTS

EP 0225010 A1 6/1987

(Continued)

*Primary Examiner* — Nathan Flynn
*Assistant Examiner* — Trang Doan
(74) *Attorney, Agent, or Firm* — Rothwell, Figg, Ernst & Manbeck, P.C.

(57) ABSTRACT

A portable or embedded access device is provided for being coupled to, and for allowing only authorized users access to, an access-limited apparatus, device, network or system, e.g. a computer terminal, an internet bank or a corporate or government intranet. The access device comprises an integrated circuit (IC) providing increased security by bridging the functionality of biometrics input from a user and, upon positive authentication of the user's fingerprint locally to provide secure communication with the said access-limited apparatus, device, network or system, whether local or remote. A corresponding method of using the portable device or the embedded device is disclosed for providing a bridge from biometrics input to a computer locally, into secure communication protocol responses to a non-biometrics network. A method of providing secured access control and user input in stand-alone appliances having an embedded access control or user input device according to the invention is also disclosed.

25 Claims, 11 Drawing Sheets

U.S. PATENT DOCUMENTS

| | | | |
|---|---|---|---|
| 4,177,734 A | 12/1979 | Rhoden | |
| 4,192,380 A | 3/1980 | Smith | |
| 4,243,099 A | 1/1981 | Rodgers, Jr. | |
| 4,272,781 A | 6/1981 | Taguchi et al. | |
| 4,369,713 A | 1/1983 | Richardson | |
| 4,372,161 A | 2/1983 | de Buda et al. | |
| 4,457,236 A | 7/1984 | Akhmadiev et al. | |
| 4,460,920 A | 7/1984 | Weber et al. | |
| 4,463,814 A | 8/1984 | Horstmeyer et al. | |
| 4,537,136 A | 8/1985 | Douglas | |
| 4,557,327 A | 12/1985 | Kinley et al. | |
| 4,670,862 A | 6/1987 | Staron et al. | |
| 4,676,310 A | 6/1987 | Scherbatskoy et al. | |
| 4,686,653 A | 8/1987 | Staron et al. | |
| 4,838,170 A | 6/1989 | Illakowicz | |
| 4,862,808 A | 9/1989 | Hedgcoxe et al. | |
| 4,919,223 A | 4/1990 | Egger et al. | |
| 5,142,989 A | 9/1992 | Suzumori et al. | |
| 5,144,680 A * | 9/1992 | Kobayashi et al. | 382/124 |
| 5,184,676 A | 2/1993 | Graham et al. | |
| 5,293,823 A | 3/1994 | Box | |
| 5,309,844 A | 5/1994 | Zollinger | |
| 5,358,039 A | 10/1994 | Fordham | |
| 5,375,530 A | 12/1994 | Zollinger et al. | |
| 5,375,668 A | 12/1994 | Hallundbaek | |
| 5,794,703 A | 8/1998 | Newman et al. | |
| 5,848,479 A | 12/1998 | MacIndoe | |
| 5,991,408 A | 11/1999 | Pearson et al. | |
| 6,003,606 A | 12/1999 | Moore et al. | |
| 6,041,410 A * | 3/2000 | Hsu et al. | 713/186 |
| 6,089,323 A | 7/2000 | Newman et al. | |
| 6,100,811 A | 8/2000 | Hsu et al. | |
| 6,112,809 A | 9/2000 | Angle | |
| 6,134,340 A * | 10/2000 | Hsu et al. | 382/124 |
| 6,179,055 B1 | 1/2001 | Sallwasser et al. | |
| 6,232,773 B1 | 5/2001 | Jacobs et al. | |
| 6,241,031 B1 | 6/2001 | Beaufort et al. | |
| 6,256,737 B1 * | 7/2001 | Bianco et al. | 713/186 |
| 6,273,189 B1 | 8/2001 | Gissler et al. | |
| 6,427,786 B2 | 8/2002 | Beaufort et al. | |
| 6,478,097 B2 | 11/2002 | Bloom et al. | |
| 6,484,260 B1 * | 11/2002 | Scott et al. | 713/186 |
| 6,941,001 B1 | 9/2005 | Bolle et al. | |
| 2002/0089410 A1 * | 7/2002 | Janiak et al. | 340/5.53 |
| 2002/0138767 A1 | 9/2002 | Hamid et al. | |

FOREIGN PATENT DOCUMENTS

| | | |
|---|---|---|
| EP | 0564500 B1 | 10/1994 |
| EP | 0924656 A2 | 6/1999 |
| EP | 0964131 A2 | 12/1999 |
| EP | 1168137 A1 | 1/2002 |
| JP | 02002155650 A | 5/2002 |
| SU | 481748 | 9/1975 |
| WO | 9521987 | 8/1995 |
| WO | 9806927 | 2/1998 |
| WO | 9966171 | 12/1999 |

* cited by examiner

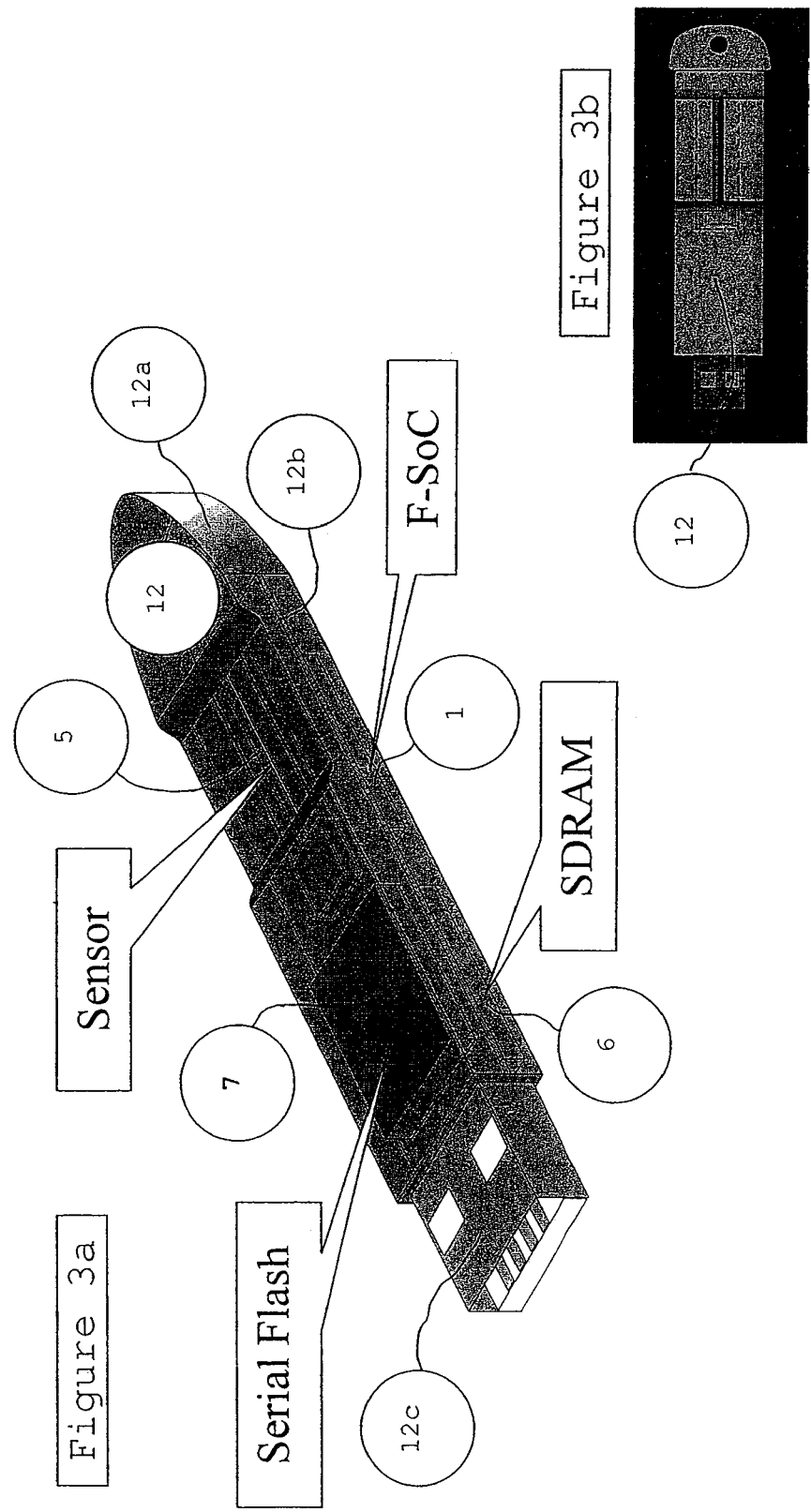

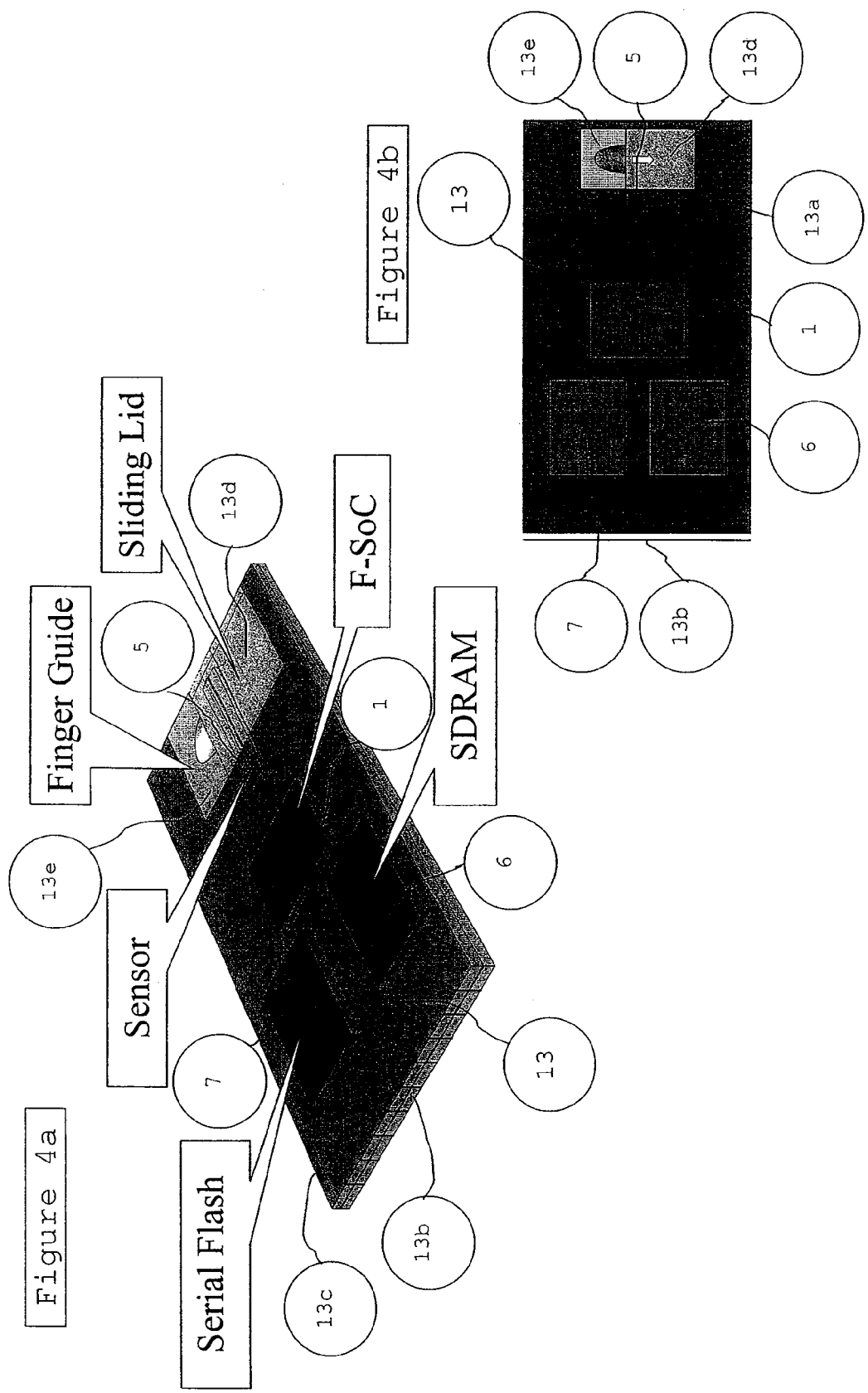

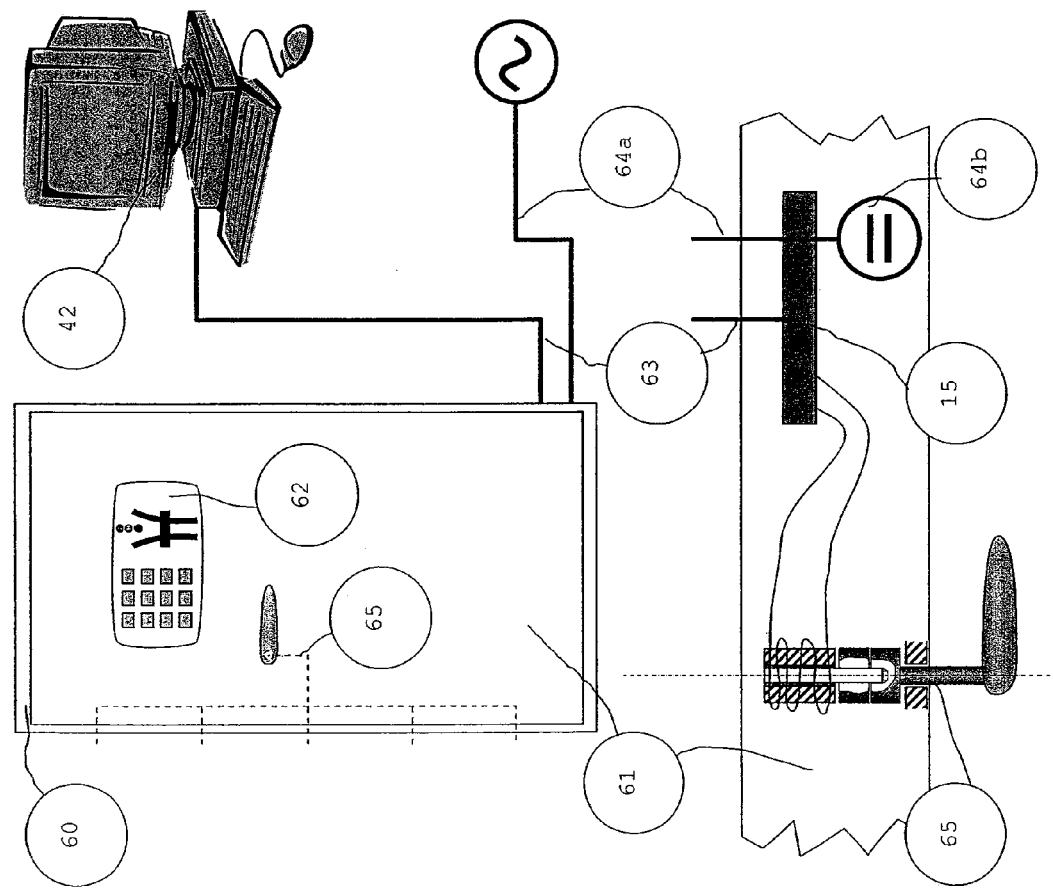
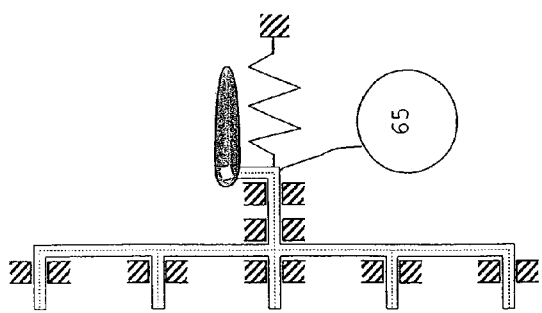
Figure 7

PORTABLE OR EMBEDDED ACCESS AND INPUT DEVICES AND METHODS FOR GIVING ACCESS TO ACCESS LIMITED DEVICES, APPARATUSES, APPLIANCES, SYSTEMS OR NETWORKS

This application is a continuation of U.S. Ser. No. 10/321,850, filed Dec. 18, 2002 now abandoned, which is incorporated by reference into this application in its entirety.

This invention is in general related to access and input devices for giving access and allowing user input in access limited devices, apparatuses, appliances, systems or networks.

In particular the invention is related to a portable and an embedded access or input devices and methods of using these in order to obtain a high level of security.

Automated access from a device or terminal to another device or a network/server is subject to authentication of authorized users. Such automated access eliminates manual authentication of the user by human recognition, and has to rely on some form of electronic identification of the user.

One way to resolve such electronic identification of the user is to issue a secret password to the user. Another method is to issue a physical token to the user. In both cases the system relies on the assumption that the person knowing such password, or alternatively carrying such physical token, has proved his identity, assuming that this has authenticated the authorized user. This is not the case, as passwords, or tokens, may intentionally be passed away to a third person, or non-intentionally and illegally acquired by such third person. Despite these obvious shortcomings of such identification by something you know (e.g. a password) or something you carry (e.g. a token) this method is still the dominating method of user identification to networks/servers, etc. because it is practical, but mainly because no better alternative is still commercially available in greater scale.

An alternative identification method is by something you are, meaning some sort of secure identification by biometrics, such as fingerprints. Although biometrics is gaining ground, this happens slowly and is not employed in a greater scale. There are several reasons for this slow growth in biometrics identification for access to networks and servers:

a. Biometrics has to gain wide public acceptance. This will be the case as soon as the benefit from biometrics identification outranks assumed disadvantages. This includes lack of knowledge about, and lack of available biometrics solutions. Very few users will acquire biometrics solutions per se, if such biometrics do not form part of an overall solution that provides substantial benefits to the user in the form of increased convenience and availability. Basically this item will be resolved when items (b) and (c) are resolved.

b. The unit cost of biometrics sensors still needs to be reduced, to achieve widespread commercial solutions. This is partly pending on cost-efficient designs, which are continuously evolving, but mainly pending on volume. This item will accordingly be resolved when item (c) is resolved.

c. The major obstacle against secure access authentication by biometrics is that the systems and solution providers must embed biometrics access control in their systems. The major obstacle to this is that there are still no commonly accepted international standards of biometrics. A system or solution provider must therefore choose between several alternative emerging biometrics standards, at the risk of choosing the wrong one, or one of the standard proposals that will not be the dominating winner. Most major system providers are reluctant to make a choice on this basis, because of the grave consequences from a wrong selection:

The costs involved by modifying software on servers etc. are considerable, especially if the non-winning standard is selected, and the software modification process has to be repeated in the near future. The price of biometrics hardware adds to this.

The negative public relation effects from selecting the non-winning biometrics standard may be serious, and shall not be under-emphasized.

The time to market will be severely prolonged if selecting a non-winning biometrics standard. This is further aggravated by the lead this will give any major competitors having selected the winning biometrics standard from the outset. This may upset the entire ranking between major solution providers.

Prior-art attempts to resolve this problem have been to enforce biometrics standards. However, there are currently several alternative standards battling side-by-side without any clear winner yet. Some known attempts to resolve the problems have been to use extracted specifics of biometrics to form encryption keys. One such solution is described in U.S. Pat. No. 5,995,630 as it requires identical biometrics representation at the receiving end (e.g. a network server). A similar approach is described in U.S. Pat. No. 5,991,408. However, none of these resolves the problem of avoiding the need to choose a biometrics standard as they both pose an even more serious problem that will delay biometrics implementation even further; namely proprietary solutions. Other attempts to resolve the problem are focused on improving the communication security by the concept of public key cryptosystems, as e.g. per European patent EP 0 225 010 B1. Though such systems enhances the security of network communication over insecure communication lines, the public key cryptosystems do not prove that the bearer of electronic certificates (checksums of keys and other identity features) is actually the right person. In addition these systems do still require a PIN code for the user to access the PKI system with electronic certificates. This means that yet another PIN code has to be remembered by the user. Moreover, the system security is no better than the protection of this PIN code. As a countermeasure to breaking PIN codes, the industry tends to make longer and longer PIN codes, making it even more difficult for the user to remember these. The natural response of the users is to write down the PIN codes, leaving the potential security breach wide open.

Accordingly the present two main directions of prior-art attempts to resolve the problems (biometrics encryption, and biometrics representation on servers, on one hand and the concept of public key cryptosystems on the other hand) do not really solve the above problems in network communication, and certainly not for secure access to devices and apparatuses.

Apparent competitors to the portable embodiments of the present invention are so-called USB Dongles with memory onboard (up to 1 Gb). Some of these USB Dongle memory devices are even equipped with fingerprint sensors to prevent unauthorized access to the information stored onboard the USB Dongle. While these devices may physically look somewhat alike one of the preferred embodiments of the present invention, there is no similarity in their functionality at all. The USB Dongles presently on the market are purely portable storage means, while the present invention focuses on secure communication triggered by an authorized fingerprint on such portable devices.

On this basis the major solution providers are hesitant to make an early move, though there is a general consensus that biometrics access control is far more secure, and convenient, than password-based or token-based access control. However, when the market leaders are hesitant to provide biometrics access methods widely offered to the market, the lack of availability to the general public will continue to restrain the growth of biometrics access control systems.

It is one object of the present invention to overcome the above limitations by providing a portable access device for being coupled to, and for allowing only authorized users access to, an access-limited apparatus, device, network or system, e.g. a computer terminal, an internet bank or a corporate or government intranet comprising a device interface, being electronic or mechanical or both, for coupling the device to the access-limited unit, e.g. a computer terminal port.

It is a second object of the present invention to overcome the above limitations by providing an embedded access device for integration into peripherals of networked computers or communication terminals, to allow only authorized users access to all types of proprietary networks (LAN, WAN, etc.) typically represented by internet banking applications, corporate and government intranets, and similar.

It is a third object to provide a method of using a portable access device or an embedded access device for providing a bridge from biometrics input to a computer, into secure communication protocol responses, to a non-biometrics network.

It is yet another object to provide a portable or embedded access device and methods of using these, which provides improved security as compared to present technology.

It is a further objective of the present invention provide a portable or embedded access device and methods of using such which does not require a transfer of biometrics fingerprint information over otherwise open and insecure parts of communication systems using such devices.

It is yet another object of the present invention provide a portable or embedded access device and methods of using such which does not rely on the development on international biometrics standards.

It is a further object of the invention to provide a combined embedded access control and user input device or apparatus and use of such a device which can be a built-in part of stand-alone appliances with some form of access control which also satisfies the objectives set out above.

It is yet a further object of the invention to provide a method of improved secure access control and user input in stand-alone appliances having an embedded access control or user input device as given above.

The objects of the invention as set forth above are obtained with a portable device as given in independent claim 1.

Preferable embodiments of the portable device are given in the dependent claims 2-6.

The objectives of the invention are also obtained with an embedded access device as given in independent claim 7.

Preferable embodiments of the embedded access device are given in the dependent claims 8-9.

The objectives of the invention are also obtained with a method of using a portable access device according to claim 1 or an embedded access device according to claim 7 in a way as given in the independent claim 10.

Preferable embodiments of the method are given in the dependent claims 11-17.

The objectives of the invention are also obtained with an embedded access control and user input device or apparatus having the features as given in the independent claim 18.

Preferable embodiments of the embedded access control and user input device or apparatus are given in the dependent claims 19-21.

The objectives of the invention are also obtained with a method of secured access control and user input in stand-alone appliances as given in the independent claim 22.

The invention will now be described in detail by references to the accompanying figures where FIG. 1a Shows a network (N) or a system using a fingerprint sensor according to prior art.

FIGS. 3a,3b Shows a portable access device according to the invention in the form of a USB dongle.

FIG. 7 Illustrates how an access control and user input device or apparatus according to the invention may be arranged as a built-in part of a medicine cabinet.

Figure 1A:
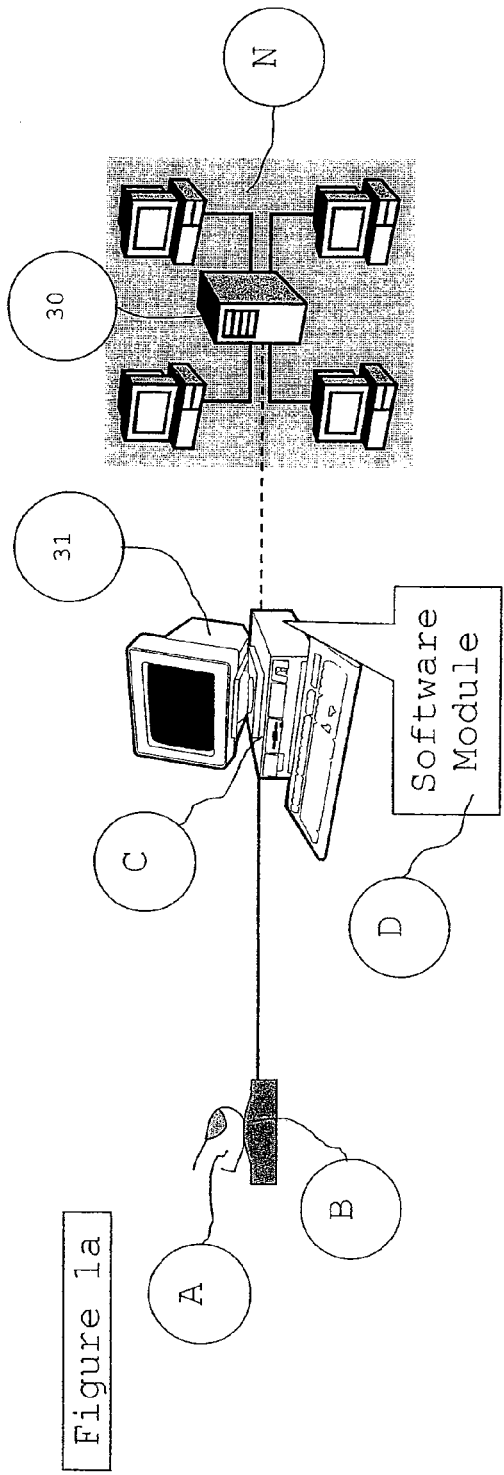
FIG. 1b Shows a network (N) or a system of devices employing a biometrics device according to the invention.

The traditional biometrics approach, as per current methods, is illustrated in FIG. 1A. The User places, or swipes his finger (A) over the access/input device with a fingerprint sensor (B). The entire image from the sensor (B) is transmitted from the access/input device to the processor (C) (e.g. a PC) where implemented Software Module(s) (D) acquires the sensor signals and processes them to reconstruct a 2-dimensional fingerprint image, and thereafter extracts the particulars of the fingerprint, and finally either perform a matching locally at the PC (C) or transmits the interpreted fingerprint essentials to a server in a network (E)

Figure 1B:
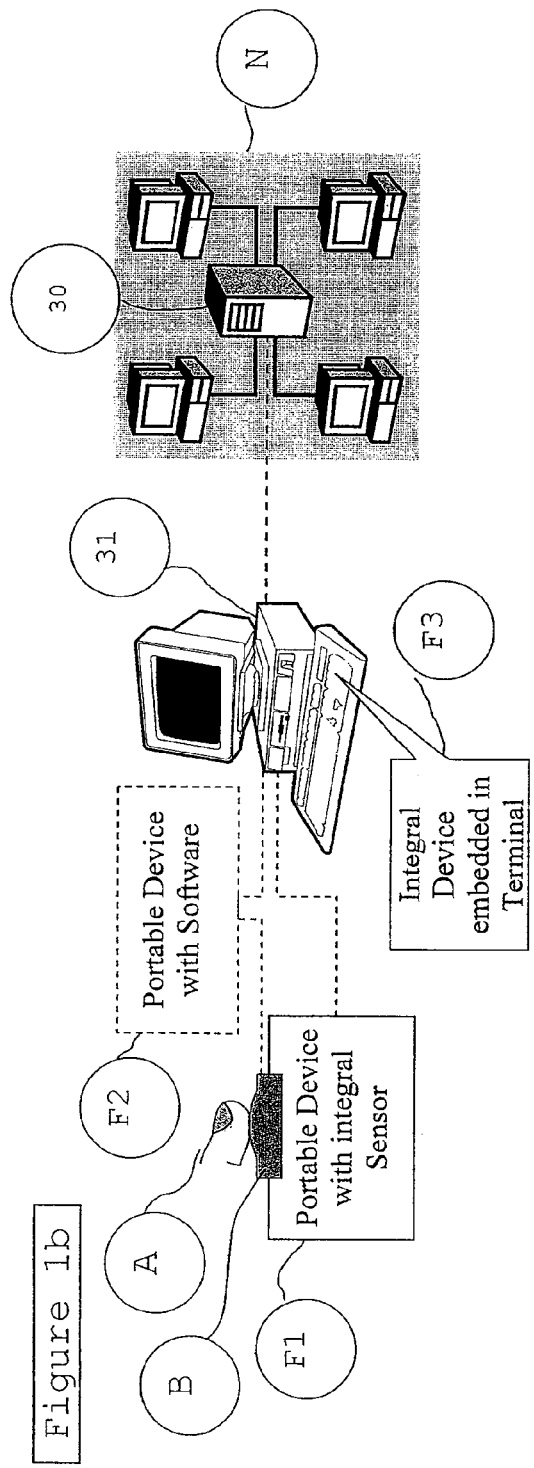

In an access-limited apparatus, device, network or system (N), e.g. a computer terminal, an internet bank or a corporate or government intranet, a portable access device for allowing only authorized users access is preferably arranged as shown schematically in FIG. 1B. A biometrics processor (F1) may be integrated with the sensor (B), or alternatively mounted as a separate integrated circuit (F2) next to or closely coupled to the sensor (B), or alternatively be embedded in a PC or its peripherals (F3). The sensor (B) and the biometrics processor (F; referring to F1, F2, or F3) may work in a stand-alone mode (e.g. in a hotel safe without connection to a network) or be may be connected to another device (C) and optionally networked (E). The biometrics processor as an integrated circuit is exemplified in FIGS. 2A and 2B. The advantages of this configuration are multiple. As the biometrics processor (F) is directly connected to he sensor (B) the biometrics processor (F) can be tailored to optimize the interaction between the sensor (B) and the biometrics processor (F). Such tailoring of the biometrics processor (F) to the sensor (B) combined with is direct connection to the sensor (B), or integration therein, enables inclusion of methods and procedures that severely constrains interception of the signals between the sensor (B) and the biometrics processor (F). It further significantly reduces the network traffic between the sensor (B)/biometrics processor (F) and the other networked processors (C and N). The major advantage is, however, that the biometrics processor can transform the biometrics from the sensor (B) to general communication security measures in a network, such as including Secure Key Generation (SKG) as basis for encryption into the biometrics processor (F). By this method biometrics sensors (B) may be connected to a network (C and N) in a secure manner according to existing infrastructure, without requiring that the supplier of the network system architecture makes any decision on which biometrics standard will evolve in the future as the winning standard. By this method the biometrics processor (F) becomes a bridge between biometrics sensors (B) and current infrastructure of networks (E).

Figure 2A:
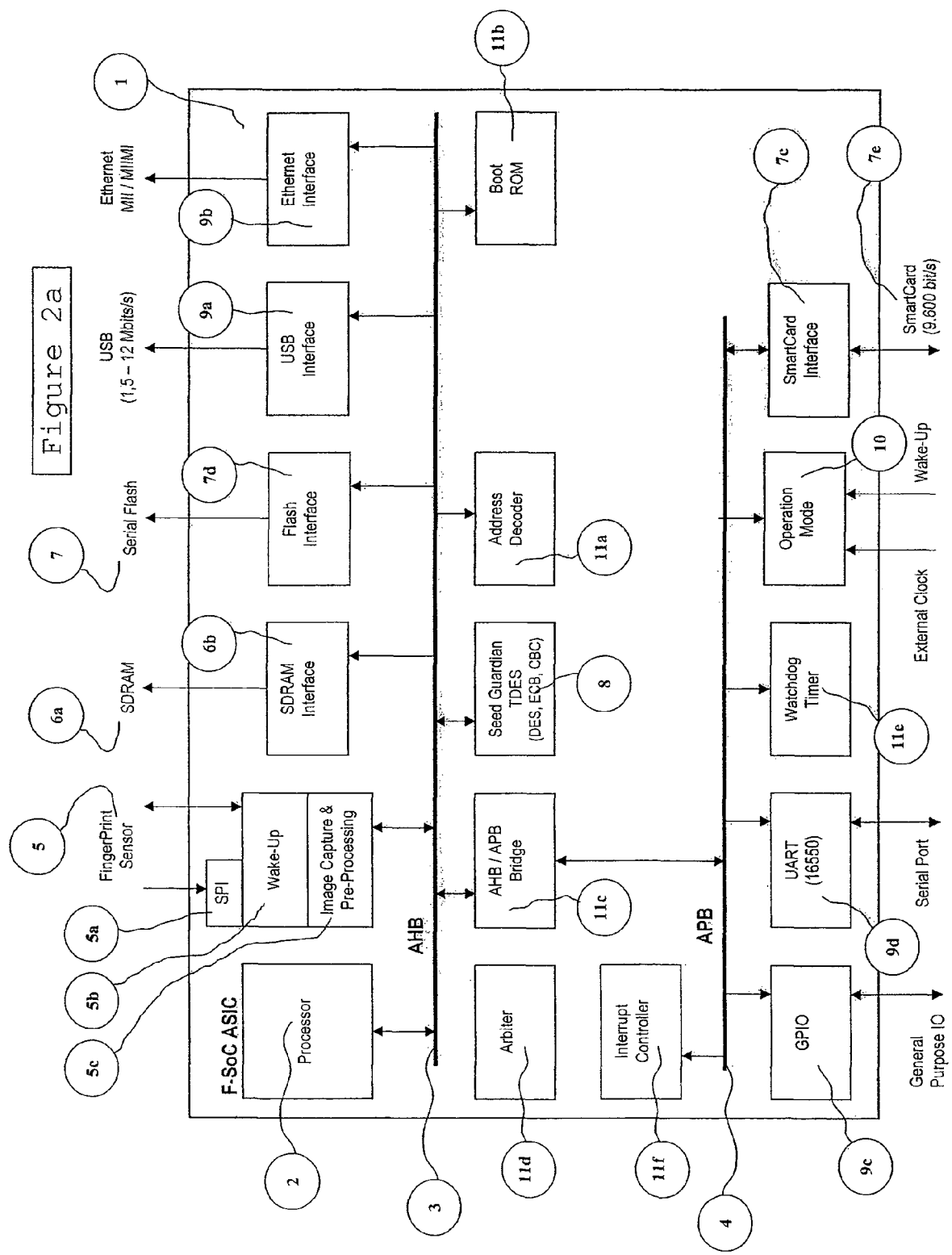
FIG. 2a Shows a first realization of an integrated circuit that is an integral part of the invention.
Figure 2B:
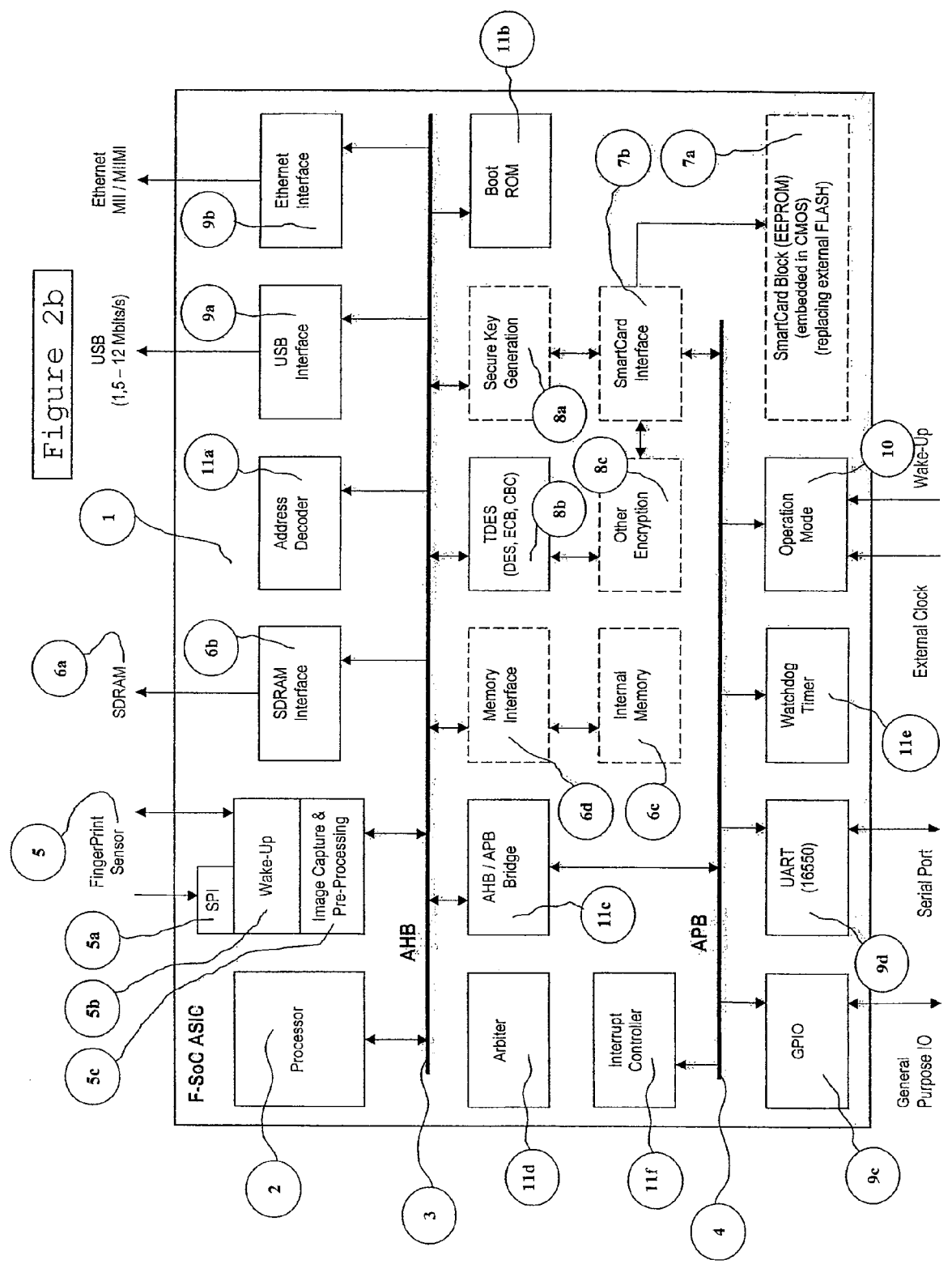
FIG. 2b Shows a second realization of an integrated circuit that is an integral part of the invention.

A biometrics sensor in the form of a fingerprint sensor (5) is coupled with a biometrics processor in the form of an integrated circuit—IC (1) that is the core device of the invention. Two versions of the IC are shown in FIGS. 2A and 2B. The details of the ICs will now be explained.

The sensor (5) is connected to a fingerprint sensor signal capturing and pre-processing block (5C) via a first interface block (5A) as well as a wake-up circuit (5B), the function of the latter being to power up all other blocks of the IC (1). When a finger is detected on the sensor (5) surface, the output signals from the sensor (5) will raise beyond a pre-set threshold, triggering the wake-up circuit (5B) to power up the rest of the IC (1) in a pre-set sequence. The first blocks to be powered up are the Image Capture and Pre-processing block (5C) as well as the high-speed bus (3) and the volatile memory (6 or 6C), all of which are connected to the high-speed bus (3). The pre-processing block is designed to perform the initial, heavy-duty processing of the captured raw images from the sensor (5).

The intermediate results are stored in the volatile memory (6A or 6C) that is interfaced via the high speed bus (3) to a first memory interface block (6B or 6D). The volatile memory (6A or 6C) thus provides working memory that is available to other modules on the IC (1).

Meanwhile the remaining blocks of the IC (1) are powered up in a pre-set sequence, starting with the central processor (2) being a powerful processor, such as ARM 9, or equivalent. The processor unit (2) is also connected to the high-speed bus (3) for allowing communication with the other on-chip components or modules. When the pre-processing block (5C) has crunched the captured raw images to an intermediate stage of significantly compressed information, i.e. a dataset of reduced size, denoted intermediate fingerprint data. The intermediate fingerprint data are fed to the central processor (2) for final reduction of the captured fingerprint image to compact fingerprint representations, called minutiae. Such minutiae are distinct points where fingerprint lines (ridges) starts or stops, or locations of bifurcation of the ridges and may be described by at least a vector comprising X and Y coordinates, and direction of the individual minutiae, stored as an alpha-numeric string in non-volatile memory (7, 7A or 7E). The non-volatile memory (7, 7A or 7E) being coupled to the high-speed bus (3) via a second memory interface block (7B or 7D), is typically used for storing program code, e.g. administrative software, tailored security output responses, secret information like seed and key number(s) for the encryption, electronic certificates and fingerprint representations in the form of so-called minutiae. These fingerprint representations (master minutiae) are compared by the central processor (2) with master fingerprint representations stored in non-volatile memory (7, 7A or 7E). If a positive match is established, the chip may proceed with generating a secure key (SKG) either processed by a special algorithm on the central processor (2) based on a seed pre-stored in the non-volatile memory (7, 7A or 7E), or alternatively embedded in hardware block (8A). If the same SKG algorithm is run on two separate computers (e.g. a server (30) and the central processor (2) on the IC (1)) it will yield the same key, or password, when the identical algorithm on both of the two separate computers is fed with the identical seed. While the algorithms normally are assumed known, and may be the same for all computers in a network (N), or for a user sub-set, the seed is individual and secret and only known by the system administrator and the user. The SKG algorithm may be constructed to produce a pseudo-random identical key on both computers (2 and 30) that is either valid for a time frame, or alternatively changes for each transaction. This may require that the present key number as well as the past key number is stored in the non-volatile memory (7, 7A or 7E). Secret information such as seed, key numbers, IP address, etc. may either be scrambled by block (8) and stored on a regular Flash memory (7), or securely stored in SmartCard environments (7A or 7E). When a key is generated, as per above, the administrative software, stored in the non-volatile memory (7, 7A or 7E) and run on the central processor (2) may then combine information to be part of a secure communication between the IC (1) and the network server (30). The information to be encrypted may comprise User ID, password and other info. Encryption is performed in hardware blocks (8 or 8B or 8C). The rules of secure communication enforced on the prevailing network (N) are embedded in the administrative software executed on the central processor (2), and may be adapted to include PKI biometrics verification and hand-shake sequences. The encryption blocks (8, 8B or 8C) may also be used to encrypt general information transactions between the IC (1) and the network server (30), if desirable. Access to such extended encryption will be given to the user pending a positive match of his fingerprint with an authorized fingerprint representation by compact minutiae tables, pre-stored in the non-volatile memory (7, 7A or 7E). The IC (1) also comprises hardware and/or software required to supply output signals to a number of second interface blocks (9A, 9B, 9C or 9D) for transferring data to other devices and networks (N) external to the IC (1). In the present invention the IC (1) is adapted to provide data to the external access-limited apparatus, device or system. This second interface block may comprise hardware and software for supporting a USB (9A), Ethernet (9B), GPIO (9C), PCMCIA/UART (9D) and/or SmartCard (7C) interface. Except from the USB and the Ethernet interfaces, the second interface blocks are serviced by a bus (4) with lower bandwidth and capacity than the high-speed bus (3). The two buses (3 and 4) are connected by a bus bridge (11C). The hardware blocks that are not dependent on high speed are connected to the slower bus (4). The hardware blocks of the IC (1) are designed to perform their respective tasks in a minimum of time, and to interact with each other with a minimum of delays and queuing. In addition to the hardware blocks the central processor (2) executing the administrative software renders a high degree of flexibility in adapting the programming to secure communication with external devices and networks (N).

Thereby the IC (1) is designed as a multi-purpose tool that can service a fingerprint sensor (5) in a stand-alone mode, but it can also communicate with external devices and networks (N) by bridging the biometrics from the sensor (5) to a non-biometrics representation into the network (N) and onto its server(s) (30). The IC (1) transforms the fingerprint, under prevailing secure communication rules, to a regular representation by e.g. password and User ID on a server (30).

The main difference between the ICs (1) of FIGS. 2A and 2B is that the version in FIG. 2B has volatile memory (6C) and non-volatile memory (7A) as integrated blocks in the IC (1) thus reducing the demand for data exchange with external memory and thus further enhancing the security and speed of operation of the device by containing almost all data processing of the fingerprints, and therefrom automatically triggered security responses, internally within the IC (1).

Figure 4C:
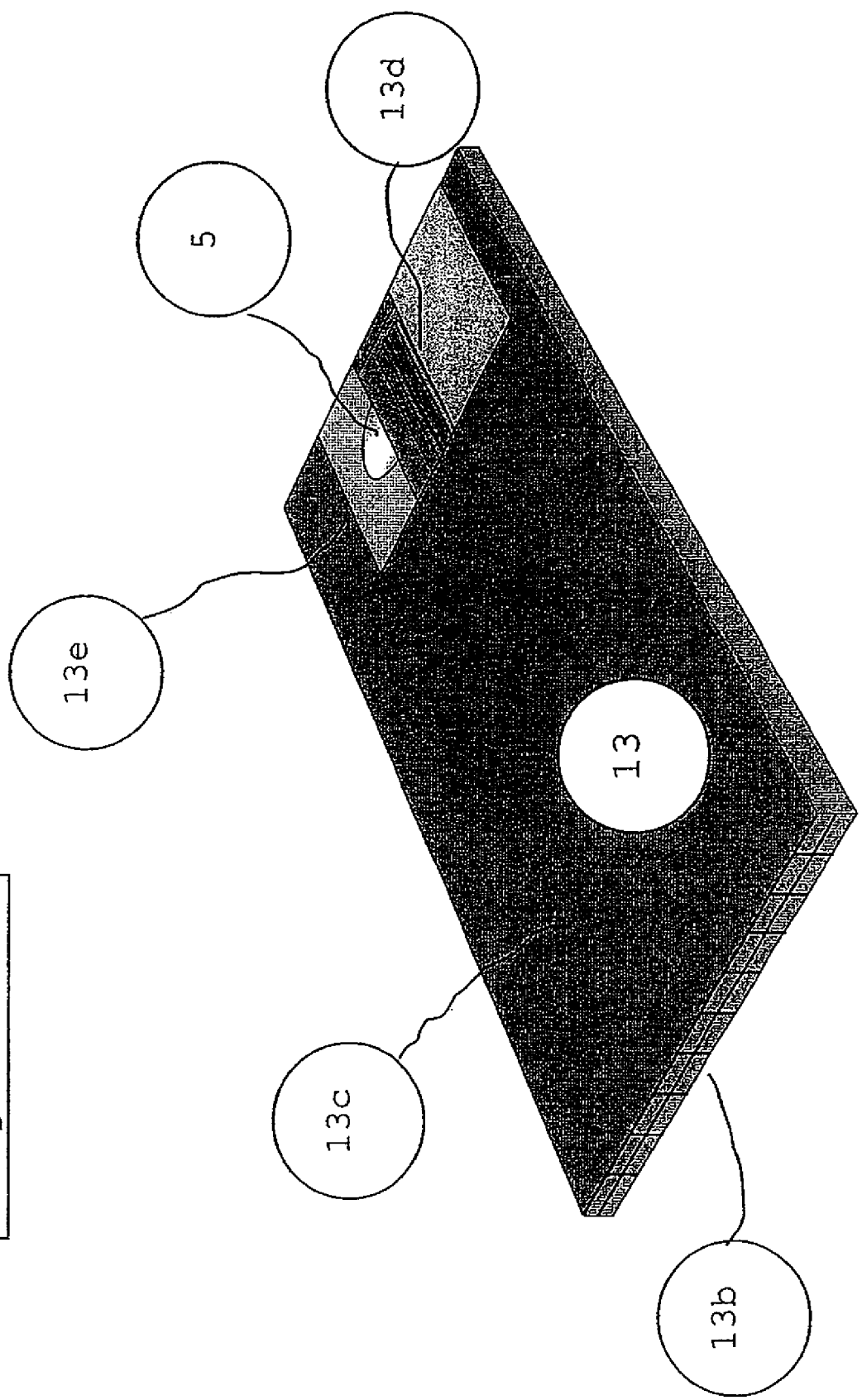
FIGS. 4a,4b Shows a portable access device according to the invention in the form of a PCMCIA card FIGS. 4c Shows a PCMCIA card where the integrated fingerprint sensor is protected underneath a sliding lid, for mechanical protection of the sensor.

The utilization of the IC (1) for authentication of an authorized user to access an intranet comprising a server (30) in a network (N) will first be explained for the alternative where the IC (1) is a portable device to be plugged into a terminal (31) of the network, either as USB dongle, as illustrated in FIGS. 3A and 3B, or as a PCMCIA card, as illustrated in FIGS. 4A and 4B.

In one embodiment of the invention, the portable device has an IC (1) being mounted on a small printed circuit board PCB (12B) also carrying a fingerprint sensor (5). The PCB (12B) is connected to at least one of a USB interface (12C) or a PCMCIA mechanical interface (13B). Electronic surface components to support at least one of the USB mechanical interface (12C) and the PCMCIA mechanical interface (13B) are mounted on the PCB (12B). An SDRAM chip (6), typically at least with 4 MB capacity, is also mounted on the same PCB (12B). Further a non-volatile serial Flash chip (7), typically with at least 256 Kbytes capacity, is also mounted on the same PCB (12B). In this embodiment all preceding components and chips are protected inside a housing (12A or 13C).

In another alternative embodiment of the invention the portable device has a housing designed with a recess thus enabling a finger (A) to be placed on, or swiped over the sensor (5). With the sensor arranged in the bottom of the recess, it will be have some protection, while still being conveniently accessible by the finger (A).

In yet another embodiment of the invention the portable device is designed with a housing which is equipped with a sliding lid (13D) enabling a finger (A) to be placed on, or swiped over the sensor (5) being protected under said sliding lid, but still conveniently accessible by the finger (A).

The sliding lid (13D) may be forced into closed position by a spring, thus fully covering the sensor (5) when the sliding lid is not pushed aside by a finger (A) when a fingerprint image is to be captured. A finger guide structure (13E) is placed adjacent to the sliding lid (13D) when the sliding lid (13E) is in closed position, fully covering the sensor (5). The purpose of the finger guide (13E) is to intuitively guide the finger (A) in correct position to open the sliding lid (13D) and thereby swipe the finger (A) correctly over the sensor (5) if the sensor (5) is of the swipe type. In this embodiment the UART interface (9D) on the IC (1) typically supports the PCMCIA port (13B).

In a further embodiment of the invention the portable device is equipped with non-volatile memory (7) that is expanded with extra capacity beyond the 256 Kbytes minimum capacity to provide extra storage capacity for data, thereby enabling the device to operate as a general portable data storage. For such extra storage capacity, the IC (1) can be equipped with a USB mass storage class controller with at least one control endpoint and 2 bulk endpoints (in/out) in order to provide access to data onboard the portable device, only accessible upon positive match of the captured fingerprint image with one of the fingerprint representations of authorized users stored onboard the portable device.

The following operations will typically be performed for applications of the devices according to the invention:

The network administrator will organize issue of the portable devices (12 or 13) to the authorized users in a personalization process for the chip/IC (1) wherein data is pre-stored into the chip/IC (1). This involves loading the IP address of a targeted Intranet server, the selected encryption algorithm, and other data characterizing the Intranet, onto the portable device (12 or 13). This information is either scrambled by block (8) for storage on external non-volatile Flash memory (7), or alternatively stored securely in embedded non-volatile SmartCard memory (7A) or on an external non-volatile SmartCard memory (7E).

The network administrator, or persons he has delegated authority to, will then enroll the user who will be the "owner" of the portable device (12 or 13). Such delegation may be performed by the administrator enrolling new sub-administrators on the server, with privilege to enroll new users. When the administrator has enrolled a sub-administrator, including capturing one or more of the sub-administrator's fingerprints, the administrator must counter-sign with his own pre-approved fingerprint, before the sub-administrator privilege to enroll new users is authorized by the software on the server (30). Thereby a delegation hierarchy is maintained, enabling tracking of administrator and sub-administrator authorizations, to check for non-intended use of the administrator rights, to detect any unfaithful servants in the hierarchy.

Enrolment of a new user, by the administrator or a sub-administrator, will be performed on a terminal connected to the server (30). The administrator (or a sub-administrator) will perform the enrolment procedure of a new user, including capturing one or more fingerprints of the new user, and issuing a seed for the SKG algorithm to such new user. Eventually the administrator, or sub-administrator, will complete this procedure by counter-signing with his fingerprint. If the counter-signature fingerprint matches that of an authorized administrator, or sub-administrator, the enrolment procedure is deemed valid, and the personalized data downloaded to the portable device (12 or 13) connected to the terminal. If the counter-signature is not authenticated, the enrolment is deemed to be non-valid, and will be aborted.

The user has, by the above enrolment and issuance of a portable device (12 or 13), become authorized to access the Intranet network (N), or parts thereof. In the latter case, with partial access, the definition of which parts of the network the user has authorized access to, or which directories on the server (30) will be defined in the User Profile, stored on the server (30).

The user may by means of such portable device securely access the server (30) of the network (N) from a terminal (31) in the network (N), or from any terminal connected to the server (30) in the network N, by Internet, either by landlines or by wireless connections. Such access will now be described by example of the USB Dongle as illustrated in FIGS. 3A and 3B containing an IC (1) as shown in FIGS. 2A and 2B.

This example involves a user traveling, wanting to connect to the Intranet server (30) of the network (N) from an Internet Café or a Business Center at a hotel. The user will insert the portable device (12 or 13) into the USB port (or alternatively into the PCMCIA slot of the terminal, if the portable device is a PCMCIA card). The USB Dongle (12) may have an extension cord for the USB connection, in case the USB port is awkwardly positioned on the back of the terminal (31).

To initiate the connection procedure, the user swipes his finger over the fingerprint sensor (5) of the USB Dongle.

This will trigger a signal to the wake-up block (5B) of the sensor interface (5A) on the IC (1).

The triggering signal from the sensor (5) to the wake-up block (5B) will cause the wake-up circuitry (5B) to power up the pre-processing block (5C), the high-speed bus (3) and the volatile working memory (6A or 6C). The pre-processing block (5C) will immediately start capturing the fingerprint image from the sensor (5) via a first interface block (5A), while the wake-up circuitry (5B) is powering up the remaining blocks of the IC (1), starting with the central processor (2).

The pre-processing block (5C) will crunch the raw data, i.e. the captured fingerprint images, using hardware-embedded algorithms optimized for the laborious initial high-speed processing of the fingerprint data, thus reducing them to an intermediate form, to be stored in the working volatile memory (6A or 6C).

When this data reduction is completed by the pre-processing block (5C) designed to perform this number-crunching at a maximum speed in dedicated hardware block (5C), the reduced data are gradually transferred from the working volatile memory (5C) to the central processor (2) via the high-speed bus (3).

The central processor (2) will further reduce the fingerprint data to a compact form by so-called minutiae, where significant details of the fingerprint are transformed into an alphanumeric string comprising at least X and Y coordinates of each minutiae, plus its direction. This compact fingerprint representation by minutiae may be expanded with other features deemed necessary. When the central processor (2) has completed the reduction of the captured fingerprint image to compact minutia form, it will transfer this access minutiae table via the high-speed bus (3) for temporary storage in the working volatile memory (6A or 6C).

Then the central processor (2) will retrieve the compact fingerprint minutia information from a master minutiae table, created during the enrolment of the authorized user(s), stored in non-volatile memory (7, 7A or 7E), and compare it with the access minutiae table temporarily stored in working volatile memory (6A or 6C).

The matching algorithm, being a subset of the administrative software, will position the minutiae points of the access attempt minutiae table over the minutiae points of the master minutiae table, and translate and rotate the upper until a best fit is established. Such best fit is deemed by allocating a pre-defined tolerance area around each of the master minutiae points, and checking if the position of the access attempt minutiae points are falling within the boundaries of the tolerance area. Thereby a comparison of the extracted features representing the captured fingerprint with features of the pre-stored master fingerprint representations is obtained.

The number of minutiae points matching between the access attempt minutiae table and the master minutiae table, required to validate an authenticated user is pre-set in a sub-set of the administrative software by the system administrator. The minimum number of coinciding minutiae points required to declare a positive match, may be varied by the system administrator according to the sensitivity of the contents of the directory which the user is seeking access to. The concept of a binary match or non-match may be expanded with a quality feature, where an absolute match, whereby the access attempt minutiae point is exactly coinciding with the corresponding master minutiae table, gives the highest quality score. The quality score of each matching minutiae pair may then be decreased gradually until the location of the access attempt minutiae falls towards the boundary of the tolerance area around the master minutiae point. If the matching is positive, the connection process will automatically continue. If the result of the matching is negative, then the connection process is aborted at this stage.

One result of the occurrence of a positive match could be that the release of an IP address from the SmartCard block (7A) or from the external SmartCard chip (7E).

The next step of the connection procedure comprises the device (USB Dongle or PCMCIA card) (12 or 13) automatically loading a Java applet from its non-volatile memory (7, 7A or 7E) onto the terminal (31) via the USB port (9A) in the case of the device being a USB Dongle, or via the UART port (9D) in the case the device is a PCMCIA board. This Java applet contains the IP address of the server (30) that the user is seeking authorized access to.

When the central processor (2) has established a positive match between the access attempt minutiae and the resident master minutiae, the administrative software [stored in the non-volatile memory (7, 7A or 7E)] will calculate a secure key. The secure key will either be calculated by an algorithm executed on the central processor (2) (in case of FIG. 2A), or alternatively by a dedicated hardware block (8A) in case of FIG. 2B). The general algorithm will generate the secure key, and the particular key or password will be generated as a result of the seed being inputted to the algorithm. This seed will either be scrambled and stored in scrambled format in non-volatile memory (7) in the alternative of FIG. 2*a*, or be securely stored in a SmartCard environment (7A) in case of the alternative IC architecture outlined in FIG. 2*b*.

The secure key will be input to the encryption block (8, 8B or 8C) for encryption of a message/communication. The message will comprise the following elements:

The device number of the USB Dongle or the PCMCIA card (12 or 13) and the SKG key number (not the key itself) in non-encrypted format.

The IP address of the device (12 or 13) in encrypted format.

The secure key number (in encrypted format).

The user ID, in encrypted format.

Optionally PKI verification in encrypted format, in case of authentication of the user holding the electronic certificate.

Other encrypted information required by the particular requirements for secure communication, of the prevailing Intranet.

The calculated communication response is thus a result depending on the above comparison of fingerprints. This message/communication is encrypted to form a secure output in a predefined format and sequence (e.g. hand-shake procedures) and transferred to an external unit, network or system through one of the communication interfaces.

Thus if a positive match of the captured fingerprint with the fingerprint representation of an authorized user is obtained, an output signal from the IC/chip (1) including target IP address and encrypted communication is generated.

When this information is received by e.g. the target server (30) of the network (N) the receiving server (30) will look up the non-encrypted serial number, or IP address of the device (12 or 13) in the privilege subset of the data repository on the server (30).

From this data set the server (30) will retrieve the particular seed issued to this user, during enrolment. This seed is then inputted secure key generation algorithm SKG on the server (30), together with the open (non-encrypted) key number.

If the key number from the device (12 or 13) is higher than the key number which the server is currently using (keys are out of sync), the server will step up the key number to match that of the device (12 or 13), and generate the corresponding key from the SKG algorithm with the seed stored by the serial number of the device, as input to the decryption process.

If the key number provided by the device (12 or 13) is lower than the key the server (30) is currently using, the server will return its current key number to the device (12 or 13) implicating that the device steps up its key number correspondingly.

If this decryption fails (an erroneous password emerging), the server (30) will assume that the received communication attempt is false, and the server will abort further steps in the communication procedure.

A subset of the administrative software which tailors the output secure response to the target network or intranet (N) to a pre-defined format and sequence including handshake sequences, could be pre-loaded into the non-volatile memory (7A, 7E, or 7).

Preferably this pre-loaded subset of administrative software is able to combine one or more of the following steps:
generating a secure key or password (8 or 8A),
applying any of the encryption methods at hand and embedded in the hardware blocks, such as DES, ECB, CBC, TDES (8 or 8B) or any proprietary encryption algorithm also embedded in hardware (8C),
tailoring handshake sequences according to the rules of secure communication of the device, network or system (N). The pre-loaded subset of the administrative software is preferably also adapted to perform sequencing of the operation of the respective functionality blocks of the chip/IC (1) in order to produce secured output data which is suitable for transmission in the targeted network (C) and for processing by receiving units connected to the network (C).

The output from the IC (1) could be blocked (non-authorized access state) if the matching of the captured fingerprint is negative relative to any of the authorized fingerprint representations stored in the non-volatile memory (7A, 7E or 7).

The output from the IC (1) can be opened (authorized access state) if the above-mentioned matching is positive.

By these features of the invention a local fingerprint authentication at the device (12 or 13) will be transformed to a password and optionally hand-shake procedure as per the secure communication procedure of the prevailing network (30) without having to include a biometrics representation on the server (30). Thereby the system provider of the network (N) does not have to choose any of the emerging biometrics standards, with the embedded risk of choosing a non-winning biometrics standard. Yet the system administrator will have the security of biometrics, through devices (12 or 13) when authenticating authorized users.

Figure 5:
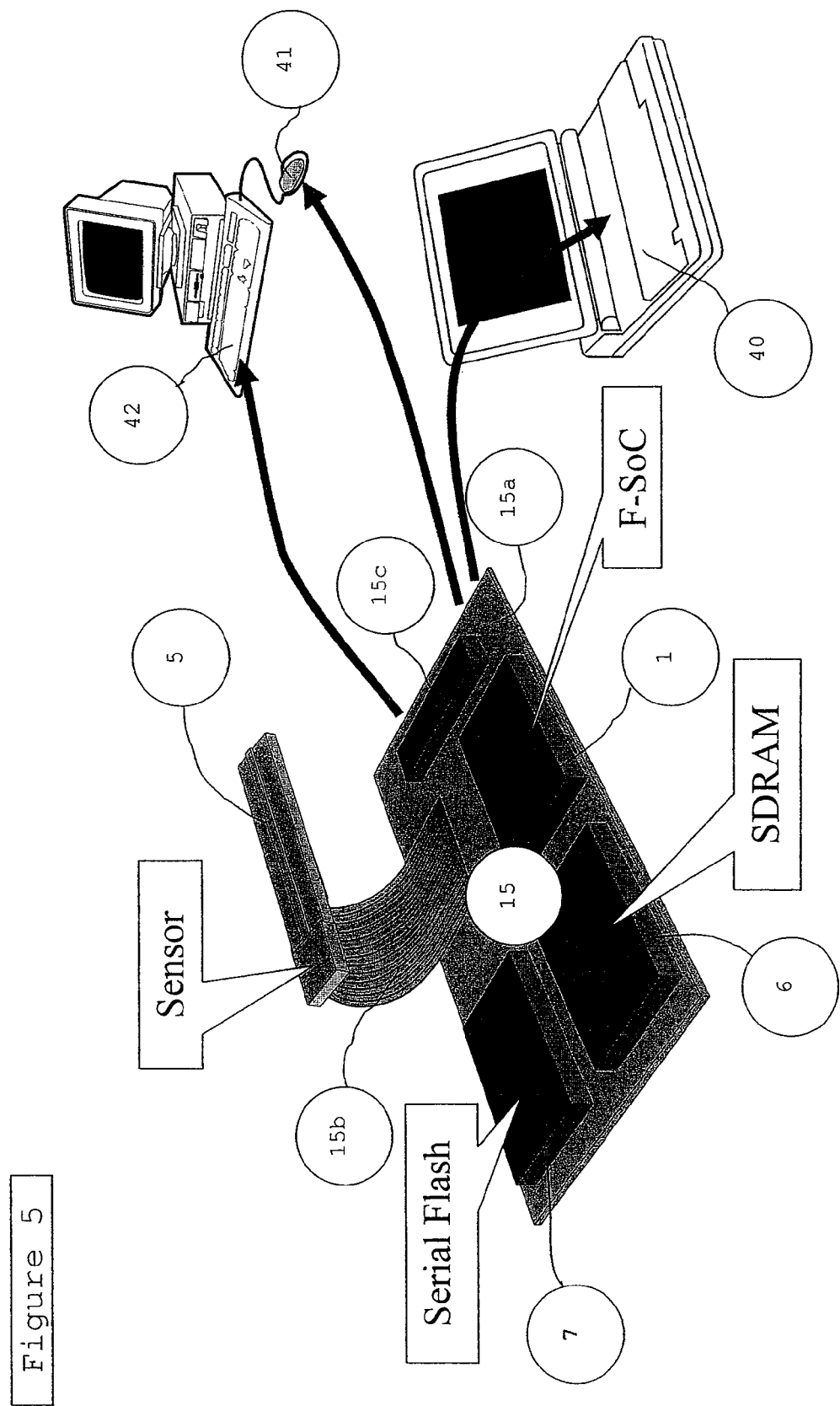
FIG. 5 Illustrates how an access device according to the invention may be embedded as part of the keyboard or mouse of a computer terminal or laptop computer.

In an alternative application according to the present invention an access device with the sensor (5) and the IC (1) is embedded in peripheral hardware of the terminal (31), such as e.g. embedding the sensor (5) and the IC (1) into a PC mouse or a PC keyboard or onto the chassis of a laptop PC. In general the access device for embedding may have all or many of the technical features of the portable device described above, however, some aspects of this application will be explained in more detail by reference to FIG. 5.

The embedded system (15) comprises the fingerprint sensor (5) being connected by a cable (15B) to a printed circuit board PCB (15A), on which the IC (1) as well as external volatile memory (6) and external non-volatile memory (7) are mounted. The PCB (15A) also contains a connector (15C) for connecting the embedded device (15) into the peripherals of a terminal (31) or the computer of a stand-alone device. The biometrics device (15) may be embedded in a mouse (41), or the keyboard (42) of the terminal (31), or in the chassis of a laptop PC (40).

This method of using the embedded access device will follow the same procedure as described above for the portable device, possibly with an alternative enrolment method termed "remote enrollment" and described below. Note that this remote enrolment alternative may as well apply to portable devices (12 or 13) as to embedded applications.

This enrolment alternative implies that the system administrator does not personally oversee who is enrolling his fingerprint at the sensor (5).

The system administrator, or his delegates, will issue a seed to the potential user, e.g. by classified mail.

The mailed parcel may in addition to the seed also include a CD-ROM with the personalization data for the biometrics device (15), in case of the embedded alternative. In case of the portable device alternative (12 or 13) the mail parcel may include the device fully personalized, so that the first user only has to enroll his finger(s).

Alternatively the new user may connect via the network (N) to the system administrator, to perform the remote enrolment procedure in online mode. This will involve a special transmission where the personalization data for the embedded device (15) are transmitted over the network in a special session.

The first person enrolling his fingerprint is assumed to have the proper identity, and will become the "owner" of the device.

Once a person has performed a remote enrolment and has become the "owner" of the device, a particular sector of the non-volatile memory (7, 7A or 7E) will be locked. This memory sector will contain the personalization data of a particular network (N). This sector can thereafter not be opened for modifications by anyone else than a system administrator with special privileges. However, other memory sectors will be available for other networks (N) or other service providers. The embedded device (15) will thereby comprise a multi-service chip in which each proprietary memory sector is non-accessible to other service providers or network system administrators.

Yet another aspect of the invention is related to stand-alone applications, or applications within a local network e.g. within a car. Examples of such applications are:
Hotel safes,
Personal safes (e.g. in student dormitories, etc.),
Medicine cabinets,
Weapon cabinets,
Biometrics system for the automotive industry.

Examples of such "stand-alone" applications will be described separately below. It should be understood, however, that this aspect of the invention may comprise all of or most of the technical aspects described above for the portable access device and the embedded access device.

The method of secured access control and user input in stand-alone applications according to this aspect of the invention will typically comprise many or all of the steps as described above for the embedded or portable access device, however, limited to operations being performed in the stand-alone application per se.

Typically, when an embedded access control and user input device or apparatus according to the invention is used in a stand-alone appliance the operating and control software of the stand-alone appliance is pre-loaded into the non-volatile memory block (7 or 7A or 7E) of the integrated circuit IC (1). The central processor block (2) of the IC (1) executes the said operating and control software of the stand-alone appliance.

The method of secured access control and user input in stand-alone appliances having an embedded access control or user input device according to the invention typically comprises steps similar to the ones outlined above for the portable access device.

Hotel safes involve frequent enrolment of new guests for a limited time (e.g. a single night stay). Further there may be multiple users (e.g. a family) requiring access to the safe. An important feature is that when leaving the safe door open for a period (say 5 minutes) all resident master fingerprint minutiae tables shall be automatically erased, so that the memory is clean when the next guest(s) checks into the room. Another factor is the ability to trace non-authorized access attempts, e.g. by unfaithful servants.

Figure 6:
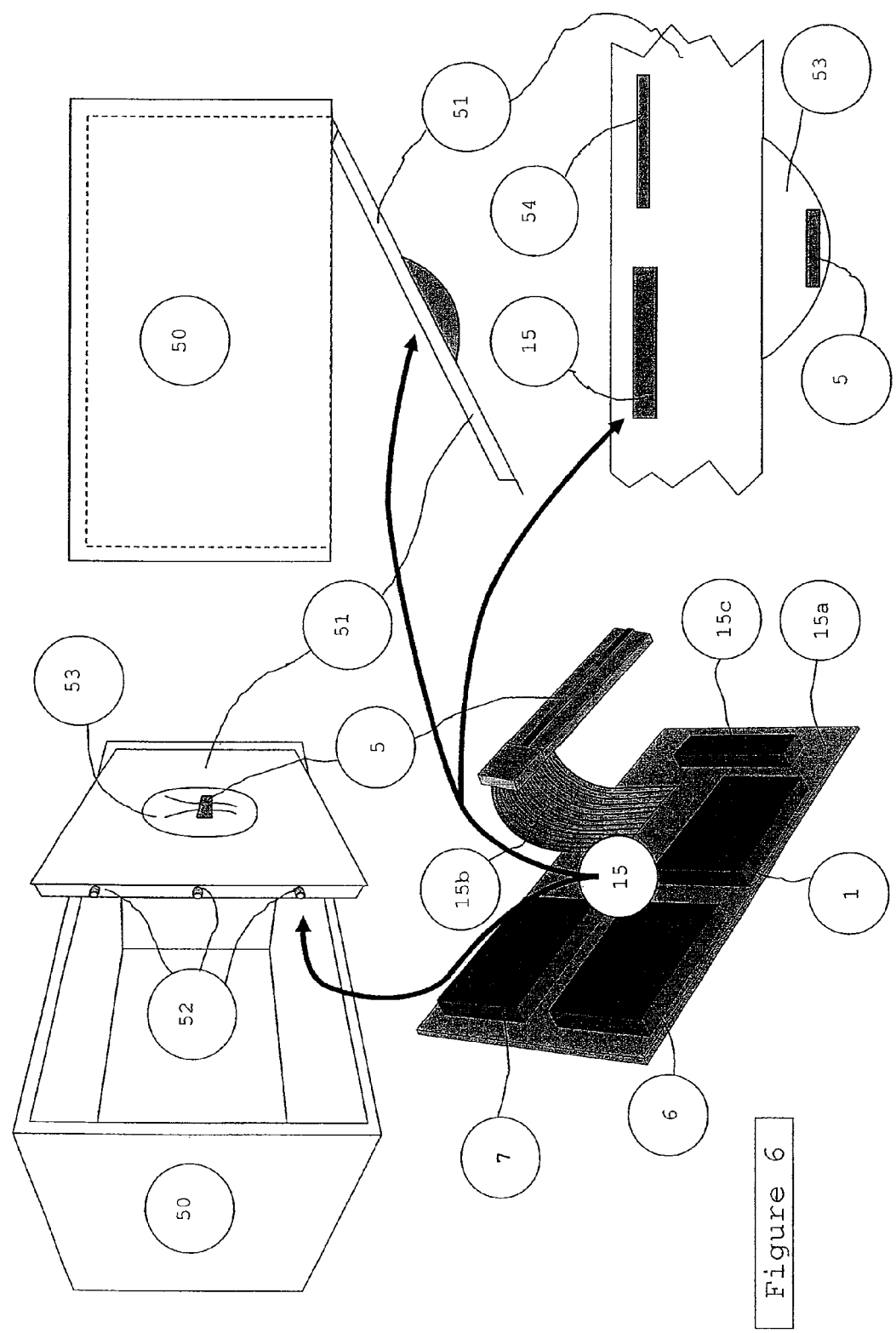
FIG. 6 Illustrates how an access control and user input device or apparatus according to the invention may be arranged as a built-in part of a hotel safe.

The hotel safe stand-alone application will be explained with reference to FIG. 6. The hotel safe (50) of this example is not connected to any network, and has only a power supply from the mains (not shown). The safe is equipped with a hinged door (51) with locking bolts (52). At the front of the hinged door (51) there is a cover (53) accommodating the user interfaces comprising a fingerprint sensor (5) and a socket for connection of a service unit (not shown). The service unit may be a PDA that may be used to re-set the settings of the safe's administrative software, downloading event tables, and download fingerprints from unsuccessful opening attempts. The fingerprint sensor (5) is connected by a cable (15B) to the printed circuit board PCB (15). The PCB (15A) accommodates the integrated circuit (1), external volatile memory (6), external non-volatile memory (7) and optionally a connector (15C) to another printed circuit board (54) containing the control system for the safe, including a connection to the service unit (not shown). The two printed circuit boards (15 and 54) are mounted on the inside of the hinged door (51) on the "safe side", while the sensor (5) is mounted on the outside, in the cover (53).

The safe will be operated as follows, with reference to FIG. 6, and FIGS. 2A and 2B. When a guest checks out of the hotel room he will leave the safe door (51) open. When the safe door (51) has been left open, for a pre-set time stored in the administrative software of the IC (1), all master minutiae fingerprint representations stored in the non-volatile memory (7) will automatically be deleted, leaving the safe memory in a "clean" state for the next guest. When the next guest(s) checks into the room the guest will find the safe (50) with the door (53) open, waiting for the next "owner" to enroll his fingerprint. The guest will now enroll his fingerprint by the sensor (5). When the guest touches the sensor (5) this will trigger an output voltage from the sensor (5) triggering the wake-up circuit (5B) of the IC (1). The fingerprint will be processed by the pre-processor block (5C) and the central processor (2) until stored in compact format as a minutiae table in non-volatile memory (7, 7A or 7E) using the volatile memory (6 or 6C) as working memory. Such processing of the fingerprint to compact minutiae representation shall take less than 1.0 seconds. When this processing is completed, a beeper (not shown) in the front cover (53) will beep for a pre-set period of say 10.0 seconds. Within this time frame a next fingerprint may be captured, processed and stored by the IC (1). This may be a second finger of the guest, or fingers of his family. This process may be repeated until the say 10 seconds time frame of beeping since the last fingerprint was enrolled elapses without a new fingerprint has been enrolled. At this stage a number of master fingerprint compact representations, in the form of minutiae, may be stored in the non-volatile memory (7, 7A or 7E). The safe door (51) may now be closed. However, at such door closure the locking bolt(s) (52) will not close until one of the enrolled users countersign with his fingerprint on the sensor (5), and this counter-signature fingerprint is found by the IC (1) to match with one of the enrolled master prints stored in the memory. This will prevent the safe from being erroneously locked by non-enrolled persons. When the safe door (52) is shut and locked, it is waiting for an authorized fingerprint to open the safe. Any non-authorized fingerprints attempting to open the safe may be recorded, for subsequent downloading to the service unit (not shown). This will have preventative effects on any unfaithful servants trying to tamper with the safes, to get illegal access. When a fingerprint image from the sensor (5) is captured and processed by the IC (1), the central processor (2) will perform a matching analysis of the access attempt minutiae with the authorized master minutiae templates stored in the non-volatile memory (7, 7A or 7E). In case of a positive match, the administrative software of the safe control PCB (54) will retract locking bolts (52) and the hinged door (51) will spring open. The safe control PCB (54) may be eliminated, by all administrative software of the safe control PCB (54) to be transferred to the IC (1) as this has ample capacity, as fingerprint processing will only be carried out a fraction of the time. The final stage of the operating procedure of the hotel safe (50) is that the user leaves the safe door (51) open when he checks out of the room, automatically causing all master prints to be erased from the non-volatile memory (7, 7A or 7E).

Personal safes (e.g. for student dormitories) will normally involve less frequent enrolment of new users, while each user shall have access to the safe for a longer period than a hotel safe. Accordingly the feature of automatic erasure of master fingerprint minutiae when the door is left open for a period will be impractical. Instead the cover (53) on the front door (51) may be furnished with a keyboard, or at least some function buttons, enabling the user to send commands to the IC (1) such as e.g. "erase master fingerprints". Alternatively such commands may be communicated from the user to the IC (1) by fingerprint commands, utilizing the navigation mode of the IC (1). Whether a function button or fingerprint commands be used, the user has to counter-sign with his fingerprint to authenticate the command. This will prevent any non-authorized persons to enter commands into the IC (1).

Medicine cabinets will have a different set-up than the above safe versions. The main purpose of a biometrics medicine cabinet is to prevent theft of narcotics and prescription drugs. Considering consequences from any emergency situations, the main purpose of the biometrics medicine cabinet is not to block access to the cabinet, but to log all accesses for subsequent review if inventory discrepancies are discovered at say each change of shifts. Further, this requires that the biometrics medicine cabinet fails to open mode, in case of a power cut, etc. Accordingly, the principles of the invention will be the same, but the flexibility of the invention will be utilized to accommodate these user interface principles. The functioning of the biometrics medicine cabinet will be made by reference to FIG. 7, and FIGS. 2a and 2b.

The biometrics medicine cabinet will be made in two versions; a networked cabinet for clinics and hospitals, and a stand-alone version e.g. for private homes. The networked version will have an external terminal (42) for administration and printing of access logs, while the stand-alone cabinet version will have a front cover (62) only. The description will first be made for the networked cabinet, and thereafter for the stand-alone cabinet.

The biometrics medicine cabinet (60) has a hinged front door (61) containing a locking mechanism (65) and a front cover with a user interface (62) comprising a keyboard, a slot for the finger including a fingerprint sensor (5) plus 3 LEDs (Light Emitting Diodes; green, yellow and red). The user interface (62) and the locking mechanism (65) are connected to a printed circuit board PCB (15) (refer FIG. 6). The PCB (15) accommodates the IC (1), the external volatile memory (7), the external non-volatile memory (6) and a connector for connection (63) to the external terminal (42) as well as power supply (64) from the mains (64A) and from a rechargeable battery (64B) for emergency power.

The locking mechanism (65) is arranged for fail-to-open, in case of complete loss of power supply, including the rechargeable battery (64B). The handle shaft protrudes the hinged door (61) supported by a bearing inside the front plate. A cylinder with internal splines terminates the handle shaft. The inner locking mechanism has a corresponding cylinder with internal splines. This cylinder is attached to a lever pushing or retrieving the locking bolts. The said lever is attached to a spring assisting in keeping the locking bolts in closed position, requiring the handle to be pushed down to open the medicine cabinet. The outer and the inner cylinders may be connected with a locking pin, with external splines, operated by a solenoid controlled from the PCB (15). In case of power loss [from the mains (64A) as well as the back-up rechargeable battery (64B)] this locking pin will connect the two cylinders (with internal splines) enabling the safe to be opened by the handle. When the system is active (power on) the solenoid will be controlled from the PCB so that the locking pin extends, and thereby connect the two cylinders, only when there is a positive fingerprint match enabling the door to be opened by the handle.

The operating procedure for the biometrics medicine cabinet for the networked version for clinics and hospitals is explained by reference to FIGS. 7, 6 and 2a and 2b.

The person responsible for safe-keeping of drugs and prescription drugs at the ward (e.g. the head nurse) will be enrolled as the system administrator on the terminal (42) being in charge of administration of access to the medicine cabinet, and tracking access to the cabinet.

Enrollment of the system administrator is performed by bringing up the access administration menu on the monitor of the terminal (42). At first registration the access table is empty (clean). The first person that registers is assigned with system administrator rights. Registration is performed by entering the name of the system administrator into the access administration table, as well as user ID, which may be the unique national identity number.

The administrator will automatically be given full privileges. When the user name and user ID is entered, the system will come up in a training mode, enabling the person to be enrolled to practice on swiping his fingerprint, until a minimum number of consecutive attempts (e.g. minimum 3) are of sufficient quality to grant access.

Fingerprint capture will be done by the sensor (5) mounted in the user interface front cover (62), or alternatively by a portable biometrics device (12 or 13) attached to the terminal (42) or by an embedded biometrics device (15) integrated in one of the terminal's (42) peripherals (40, 41 or 42).

The registration itself is explained with reference to FIGS. 2a and 2b, representing the IC (1) being mounted on the PCB (15) in the front door (or embedded in the terminal's peripherals). The first fingerprint of the system administrator is captured by the sensor (5) waking up the IC (1) by a triggering signal to the wake-up circuit (5B). The pre-processor will capture the fingerprint image, and perform the initial heavy-duty processing, reducing the fingerprint image to a compressed intermediate format, using the volatile memory (6A or 6C) as working memory via the high-speed bus (3). These intermediate data are then fed to the central processor (2) reducing the fingerprint to compact representation by minutiae. The administrative software will be set up to require a minimum of say 3 minutiae fingerprint representations of acceptable quality. If any of these fingerprint captures are of inferior quality, the administrative software will reject the attempt. When sufficient (say three) minutiae tables of the system administrator has been captured with accepted quality, these will be stored in non-volatile memory (7, 7A or 7E) as the system administrator's master minutiae table.

When the next user is to be enrolled, the system administrator will have to open this procedure by authenticating himself by his fingerprint. When such access by the system administrator is authenticated by a positive match versus the master minutiae tables of the system administrator stored in the non-volatile memory (7, 7A or 7E), the next user can be enrolled. Such enrolment is performed as described above, by a training session followed by enrolment of a minimum (say three) fingerprint minutiae (per finger) of acceptable quality. The system administrator then enters the user name and user ID of the user, and finally assigns the user's access privileges (if any restrictions). Temporary staff can be enrolled for a given calendar period. Finally when all data are entered, the system administrator must countersign with his own fingerprint, to be authenticated versus the stored master minutiae of the system administrator. The enrolment of the new user will only be completed, and accepted, upon such authenticated counter-signature.

Other users may be enrolled in the same way, at any time. The system administrator may delegate enrolment authority by entering such authorization as a special privilege in the database.

For the networked version of the biometrics medicine cabinet, the access tables will be stored both in the non-volatile memory (7, 7A or 7E) of the IC (1) embedded in the user interface cover (62) mounted on the front of the door (61) of the cabinet (60), as well as being backed up in the non-volatile memory of the terminal (42) or any server (30) which the system is connected to. Actual access control will be performed locally on the IC (1) of the medicine cabinet (60) while transactions will be copied to the back-up data storage of the terminal (42) or the server (30). Thereby the medicine cabinet (60) can be accessed even if the terminal (42) or the server (30) of the network (N) is down.

Any authorized user may enter the biometrics medicine cabinet by punching a user ID onto the keyboard of the user interface cover at the front of the hinged door, followed by a fingerprint image capturing on the sensor (5) of the user interface cover (62). Punching the user ID will trigger the wake-up circuitry (5B) powering up the complete IC (1). When the user ID has been punched in on the keyboard of the user interface cover (62) the user will submit his fingerprint on the sensor (5) mounted in the user interface cover (62). The IC (1) will process the fingerprint image captured from the sensor (5) to compact access minutiae fingerprint representation locally in the IC (1). The administrative software on the IC (1) then looks up the user ID punched in on the local keyboard of the user interface cover (62) and then compares the access minutiae table with the master minutiae table stored together with the user ID on the non-volatile memory (7, 7A or 7E) of the IC (1) during enrolment. If the minutiae matching by the central processor (2) confirms that the person seeking access is the authentic owner of the user ID, then the administrative software of the IC (1) will power up the solenoid of the locking mechanism (65) thereby extending the locking pin with external splines to connect the two cylinders with internal splines of the locking mechanism (65). This connection by the locking pin will enable the medicine cabinet to be opened by pushing down the handle of the locking mechanism.

The administrative software of the IC (1) will keep the locking pin of the locking mechanism (65) engaged for a pre-set time (e.g. 30 seconds) while one of the LEDs (light-emitting diodes) of the user interface cover (62) is flashing.

When access is exerted, by opening the medicine cabinet door (61), the event is logged in the non-volatile memory (7, 7A or 7E) of the IC (1), and copied to the database of the terminal (42) and optionally to a server (30) of a network (N).

If the matching of the access minutiae table does not match the stored master minutiae table of the user ID entered, then the locking pin of the locking mechanism (65) will not extend into the splines of the outer cylinder. Such failure to connect will disengage the handle, so that the handle is isolated and the cabinet can not be opened.

An option, to guarantee access, may be to open the medicine cabinet even if the fingerprint does not match, but then to record the fingerprint image and store it for later check. The opening procedure will be initiated the same way as above. The user enters his user ID on the keyboard of the user interface cover (62). If the user ID does not match any of the pre-stored authenticated users, the process is aborted and the red LED will flash. When a user ID match is established with a pre-stored authenticated user, his fingerprint image will be captured by the sensor (5) and reduced to access attempt minutiae by the IC (1). If there is no match of the pre-stored master minutiae of the user ID entered, the administrative software on the IC (1) may still open the medicine cabinet by extending the locking pin of the locking mechanism (65), but now this event will be recorded as a non-authenticated access event. This will cause the IC (1) to store the complete fingerprint image captured by the sensor (5) in the event table, for subsequent comparison with the owner of the user ID entered, or of other persons suspected to have accessed the medicine cabinet at the recorded time of entry. The prerequisite for such emergency opening of the cabinet is that the fingerprint image captured is of acceptable quality for subsequent matching of prints from candidate persons.

The above procedure ensures that the biometrics medicine cabinet can be accessed even in case of an emergency, but the identity of the person seeking access is either authenticated by a matching fingerprint minutiae, or the complete fingerprint image is stored for subsequent identity search. The above method of looking up the user ID and then checking the authenticity of the owner by his fingerprint enables a so-called "one-to-one" match. Thereby the number of users does not dilute the security of the system. The system will thereby provide maximum security, even for large user groups e.g. within a hospital. In this case the fingerprint will be reduced to compact minutiae form locally on the IC (1) of the PCB (15) in the door of the medicine cabinet, then encrypted by IC (1) before being transferred to a server (30) for authentication in the server data base.

The main difference between the networked version of the medicine cabinet (e.g. for hospitals and clinics, as described above) and the stand-alone version (e.g. for private homes) is that the terminal (42) and any network connection (N) to a server (30) will not be included. The differentiation between the two versions is simply a setting in the configuration of the administrative software on the IC (1) mounted on the PCB (15) embedded inside the user interface cover (62). All interfacing to the stand-alone medicine cabinet will accordingly be done through the user interface cover (62) using the individual keys of the keyboard for mode settings and commands. Any event tables from the stand-alone version of the medicine cabinet may be downloaded to a PDA functioning as a service unit, being connected by a port directly to the PCB (15). The administration of the stand-alone version will differ slightly from the above, as the user interface is limited to the front cover (62) only.

The first person to enroll the stand-alone version will be the system administrator ("owner") of the stand-alone version, given full access privileges.

The administrator may use the keys of the keyboard of the user interface cover (62) to enroll new users, or delete the previous users completely (except the system administrator).

Enrolment of new users will require authenticated matching of the counter-signature by the system administrator to be valid.

Application of the invention to weapon cabinets will be identical to the stand-alone version of the biometrics medicine cabinet, as outlined above.

Application of the invention to car systems for the automotive industry will be explained by two different preferable versions of hardware; for key to the doors of the car (central locking system) and for ignition control (ignition blocking). Although these are preferred placements of the devices according to the invention it will be understood that the same device could be embedded in any part of car that a user operates, but that it is particularly suitable to the parts where additional access limitation is useful. A key issue of application of the invention to car systems is the security issue, to prevent theft or non-authorized use of the car. Thereby this application is fundamentally different from the network version of the biometrics medicine cabinet, where the main intention was not to prevent access, but to guarantee access but leaving an audit trail by fingerprints of who has accessed the networked medicine cabinet. The automotive industry is emphasizing secure access by blocking non-authorized users access to the car. These two different applications of the invention demonstrate its versatility and flexibility, as the very same principles are applied, though with different settings of the administrative software.

The automotive application of the invention will be explained by reference to FIGS. 2B, 8 and 9.

Figure 8:
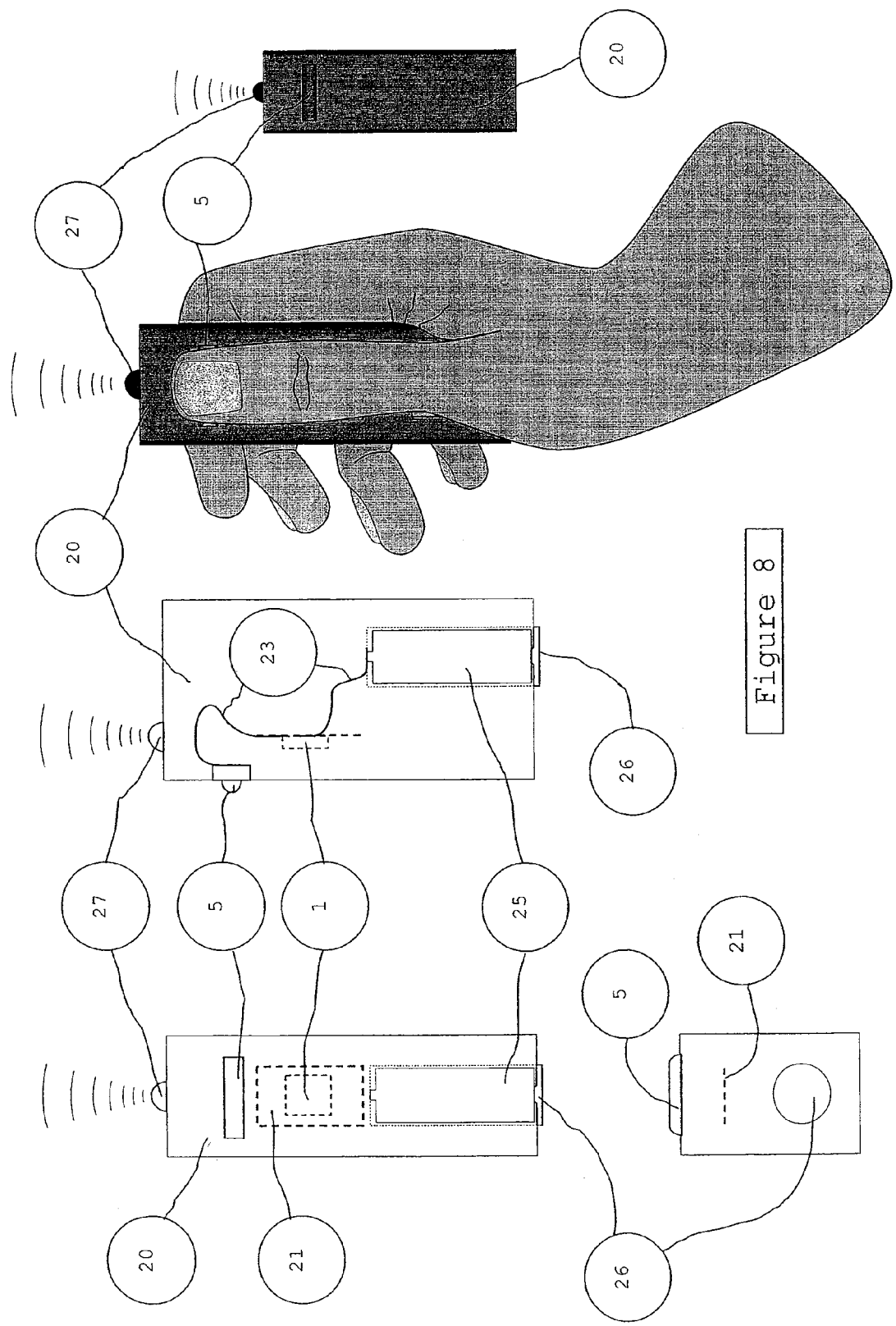
FIG. 8 Illustrates how an access control and user input device or apparatus according to the invention can be applied in a portable door control unit for the electronic systems in automotive applications.
Figure 9:
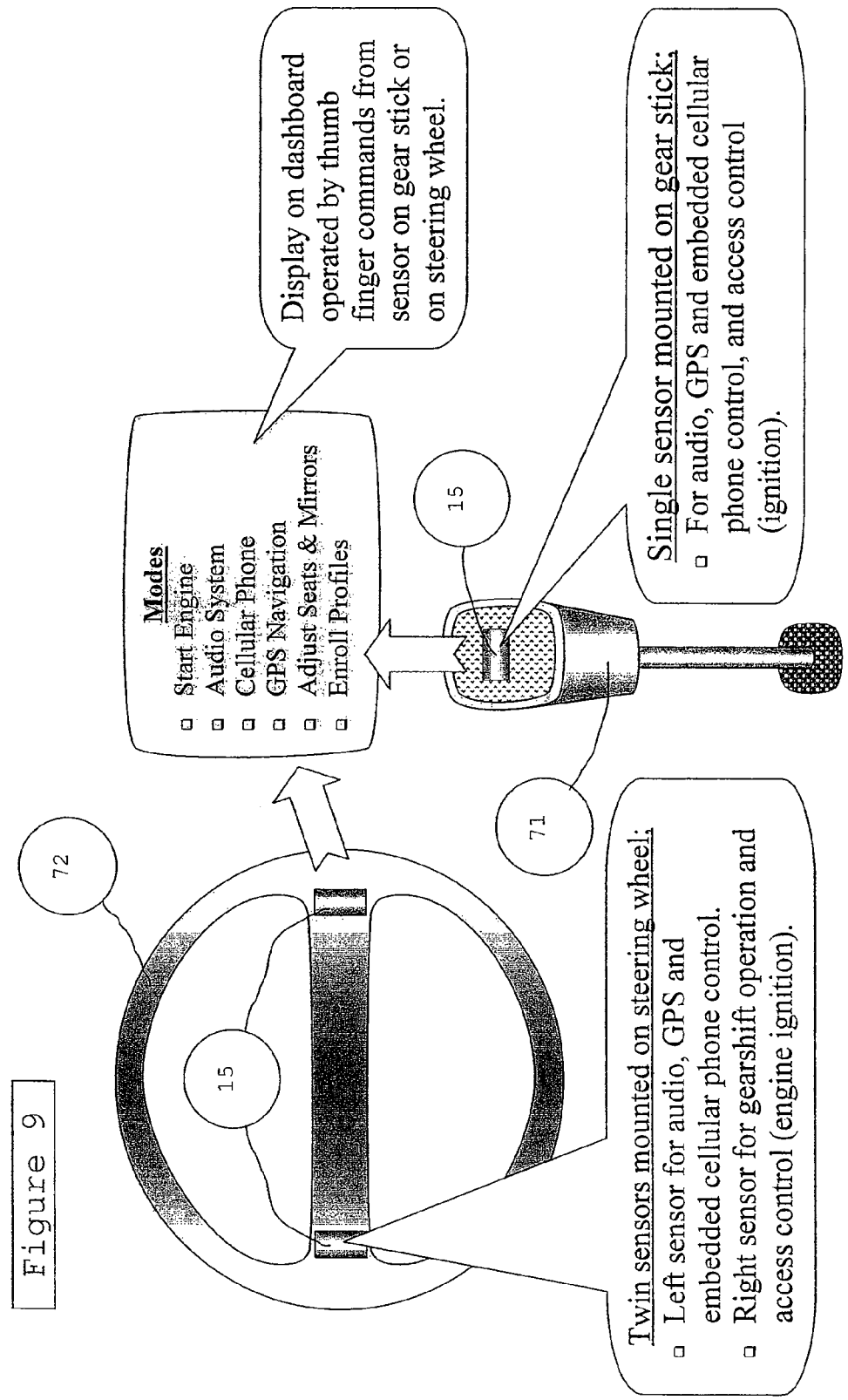
FIG. 9 Illustrates how an access control and user input device or apparatus according to the invention can be embedded in the gear stick or steering wheel of a car.

The door control (central locking system) is outlined in FIG. 8. The door control, being a portable device (20), comprises an external housing (20) which contains a fingerprint sensor (5) coupled to a miniature printed circuit board (21) on which is mounted the IC (1). The remote control (20) further comprises a battery (25) for power supply retained in the housing (20) by a removable lid (26). The battery (25) is connected to the PCB (21) by wires. The remote control is also equipped with a wireless 2-way transceiver (27), and all the active components are connected to the IC (1) by cables (23) via the PCB (21). This remote control for the car doors can be made very compact, where the size of the housing (20) is determined by the size of the battery (25). Thereby the physical size of the housing may be compressed to the size of a key-ring holder.

Inside the car is mounted another embedded device (15) (refer FIG. 9) e.g. mounted on the gear stick (71) or on the steering wheel (72), for ignition control of the engine.

These two elements; the portable remote door control (20) and the embedded ignition control (15) are both connected to a central computer in the car. The connection of the portable remote door control (20) is by 2-way wireless transceiver (27), while hard wires to the central computer (not shown) of the car connect the embedded ignition control (15).

Operation of the biometrics system for operation in cars will be explained by reference to FIGS. 1b, 2b, 5, 8, 9. The protected mode of the system will not be activated until the car is sold from the dealer.

The dealer will at this stage enter an encrypted command into the system through wireless transmission to the portable door control unit (20), which in turn will transmit the command wirelessly to the embedded ignition device (15) via the door locks and the central computer of the car.

The dealer will access the database on the terminal (42) protected by fingerprint authentication.

The database at the terminal (42) will download the particulars of the car to be sold, including its serial number (e.g. the chassis number) from a server (30) in a network (N).

These downloaded particulars will include the unique seed for the secure key generation SKG algorithm, resident in each of the IC (1) of the portable door control (20) and the embedded ignition control (15) as well as on the terminal (42).

When the dealer has proven his authority (by fingerprint verification) to this procedure on the terminal (42) he will enter the mode change routine on the terminal (42) to change the mode of the portable door control (20) and the embedded ignition control (15) from open mode, to secure mode.

The terminal (42) will encrypt a communication message to the portable door control (20) based on the particular seed of the prevailing car, generating a unique password.

The encrypted message will be wirelessly transmitted from the terminal (30) to the portable door control (20) by two-way wireless transmission, inviting to a handshake communication procedure.

The IC (1) of the portable door control (20) will receive the encrypted message and initiate decryption by fetching the seed from the non-volatile memory (7A).

This seed will be fed into the secure key generating block SKG (8A) to generate a temporary password.

The password is passed on to the encryption block (8B or 8C) along with the encrypted message from the terminal (42). If the encryption fails, the communication procedure will be terminated by the IC (1) of the portable door control (20).

If the encryption is successful the communication procedure will be completed, involving e.g. handshake sequences, until the portable door control (20) is satisfied that the message from the terminal (42) is genuine, and authorized.

Then the IC (1) of the portable door control (20) will be set in protected mode, waiting for the first user to be enrolled to be the system administrator of the biometrics system in the car.

The purchaser of the car (the car "owner") may then train in fingerprint capturing by a training module on the terminal (42).

Then the car owner will enroll one or more of his fingers on the portable door control unit (20). This involves successful capturing of a minimum of images (say three) reduced to master minutiae tables by the pre-processing block (5C) and the central processor (2) of the IC (1) on the portable device (20). These master minutiae tables will be stored in the non-volatile memory (7A) of the IC (1).

This first person to enroll his fingerprint on the portable door control (20) becomes the "owner" of the car, in the sense that he becomes the system administrator. When he has successfully enrolled on the portable door control (20) he will countersign by his fingerprint to authorize and initiate encryption of his master minutiae table(s) from the IC (1) on the portable door control (20) via the door locks and the central car computer (not shown) to the IC (1) of the embedded ignition control (15) of the car.

Such transfer of authorized master minutiae will start with retrieving the unique seed of the car from non-volatile memory (7A) of the IC (1) of the portable door control (20). The seed will be fed to the secure key generation SKG block (8A) of the IC (1) to generate a valid password.

This password will then be fed to the encryption block (8B or 8C) of the IC (1) at the portable door control (20), initiating encryption of the master minutiae tables of the "owner's" finger(s). The encrypted message will be transmitted wirelessly from the portable door control (20) by means of two-way wireless transceiver (27) via the door locks to the central computer of the car. Note that such enrolment is the only event when encrypted minutiae tables are transmitted from the portable door unit (20). At normal opening of the door matching minutiae will only be used to authorize encryption and transmission of straight commands, such as "open door" or "lock door".

If the central computer of the car is capable of successfully decrypting the message from the portable door control (20) it will forward the encrypted message to the embedded ignition control (15). Failure by the central computer of the car to decrypt the message (e.g. by non-matching temporary pseudo-random password) will terminate the communication procedure.

When the encrypted message containing the master minutiae tables of the car owner reaches the embedded ignition control (15) it will be decrypted.

The unique seed of the car will be fetched from the non-volatile memory (7A) of the IC (1) of the embedded ignition control (15).

The seed will be inputted to the secure key generation SKG block (8A) to generate a pseudo-random temporary password.

The pseudo-random temporary password will be fed to the encryption block (8B or 8C) of the IC (1) to start decryption of the encrypted message.

The "owner's" master minutiae tables of his finger(s), as retrieved from the decrypted message, will be stored in the non-volatile memory (7A) of the IC (1) of the embedded ignition control (15).

By now the "owner's" master minutiae tables are securely stored in the IC (1) of both the portable door control (20) and the embedded ignition control (15).

The "owner" of the car may now access the car as follows:

He will swipe his finger across the sensor (5) of the portable door control (20).

His finger on the sensor will trigger a signal from the sensor (5) to the wake-up circuit (5B) of the IC (1), powering up the IC (1) in a pre-set sequence.

The pre-processing block (5C) will reduce the captured fingerprint image to a reduced intermediate format, feeding it via volatile working memory (6B or 6C) and the high-speed bus (3) to the processor (2).

The processor (2) will reduce the captured and pre-processed fingerprint image to compact master minutiae format.

The processor (2) will then compare this access minutiae table with the master minutiae table(s) pre-stored at time of enrolment in non-volatile memory (7A).

In case of a match the process will be allowed to continue. If no match, the process will be aborted.

Provided the processor (2) established a match between the access attempt and one of the resident master minutiae tables, the processor will proceed to open (or lock) the car doors:

The processor (2) will fetch the seed from the non-volatile memory (7A) and feed it to the SKG block (8A).

The SKG block will generate a valid, and temporary, password that will be input to the encryption block (8B or 8C).

The processor will issue the "open door" command to the encryption block (8B or 8C) that in turn will encrypt it based on the valid, and temporary password from the SKG block (8A).

The encrypted "open door" command will then be wirelessly transmitted by the transceiver (27) from the portable door control (20) to the embedded ignition control (15) via the transceivers of the door locks and the central car computer.

The encrypted message will be decrypted by the embedded ignition control (15) by its processor (2) on its resident IC (1) fetching the seed from the non-volatile memory (7A). The seed will be entered into the SKG block (8A) to generate the identical, and temporary password fed on to the encryption block (8B or 8C). If the decrypted message confirms a valid and authenticated "open door" command, a similar encrypted command will be relayed to the door locks by the car computer.

Alternatively the decryption and authentication algorithms may be performed on the central car computer instead of on the embedded ignition control.

The important part is that an authenticated fingerprint triggers the portable door control (20) and the embedded ignition control (15) to generate encrypted communication procedures, involving handshake procedures, fully compatible with the communication procedures of the central computer of the car, and the door locks. The benefit of the invention is that no fingerprints have to be transmitted between the car system security components (except for enrolment), but triggers the prevailing, secure communication protocols.

Another benefit from this application of the invention is that the security of the complete system resides in the fingerprints of the car owner (or other users he may have enrolled), and not in some tokens, such as e.g. electronic keys with complex key generation algorithms. If such an electronic key is lost, considerable logistics are involved in issuing a new electronic key. The involved logistics make such a key replacement both very expensive, and time-consuming. The latter may cause considerable grievances to the car owner.

If a fingerprint-based portable door control device (20) according to this invention is lost, then a new portable device may be stored on the shelf by the dealer, and immediately issued to the car owner. These replacement keys have not been personalized to any particular car as no seed has been downloaded. Such personalization is being initiated by a "replacement" version of the car mode control software residing on the dealer's terminal (42). The car owner's fingerprint(s) is enrolled on the replacement portable door control (20). They may be authenticated versus pre-stored master minutiae tables in the dealer's database. When the car owner's identity is satisfactorily established, the proprietary seed of the car is downloaded from the dealer's database to the replacement portable door control (20) now being fully compatible with the embedded systems residing in the car.

As an additional safety feature the portable or embedded device could be equipped with means for the input of code or commands. This is achieved by defining a fingerprint storage segment in non-volatile memory (7, 7A or 7E) where the device may store a series of consecutive fingerprint representations generated by the fingerprint sensor signal capturing and pre-processing block (5C). Movement analyzing means, in the form of a hardware or a software movement analyzing program module analyzes the obtained series of fingerprint representations to obtain a measure of the omni-directional finger movements across the sensor in two dimensions. Translation means in the form of a hardware or a software translation program module analyzes and categorizes the omni-directional finger movements across the fingerprint sensor according to predefined sets of finger movement sequences including directional and touch/no-touch finger movement sequences. A command table is used to translate the categorized finger movements into control signals whereby the translating means generates control signal for controlling the device, e.g. the stand-alone appliance, in response to the finger movements on the sensor.

The invention claimed is:

1. A portable biometrics access device, comprising:
a device interface, being electronic or mechanical or both, for coupling the device to an access-limited apparatus, device, network or system, and
an integrated circuit (IC) providing increased security by bridging the functionality of fingerprint input from a user and, upon positive authentication of the user's fingerprint to provide secure communication with said access-limited apparatus, device, network or system, said IC comprising:
a central processor communicating with the other on-chip components via a high speed bus, a secure internal non-volatile memory connected to the high-speed bus, wherein the non-volatile memory either stores program code, administrative software, tailored security output responses and fingerprint representations in the form of compact fingerprint minutiae securely within the IC or is capable of storing encryption seeds for sensitive data stored on an external non-volatile memory, a first memory interface block connected to the high speed bus for interfacing with volatile memory and for providing working memory available to other modules on the IC, a second memory interface block connected to the high speed bus for interfacing with non-volatile memory, for alternative storing of program code, administrative software, tailored security output responses and fingerprint representations in the form of compact fingerprint minutiae, being encrypted internally in the IC by encryption seeds from an encryption block, a first interface block coupled to a fingerprint sensor, an image capture and pre-processing block connected to the first interface block, said image capture and pre-processing block being adapted to perform the initial processing of raw fingerprint images captured from the sensor into a dataset of reduced size, denoted intermediate fingerprint data, the intermediate fingerprint data being submitted as output to the central processor via the high speed bus for final processing to compact fingerprint minutiae on the central processor, one or more encryption modules connected to the high-speed bus for providing encryption information, or alternatively scrambling information, the central processor being adapted to apply the encryption information to the fingerprint data for producing secured data as an output to the high speed bus, and one or more second interface blocks for supplying the secured data to the external access-limited apparatus, device or system via the device interface.

2. The portable device according to claim 1, wherein the integrated circuit further comprises hardware and software required to supply output signals to one or more of the second interface blocks, implemented in the form of a USB-port, a PCMCIA-port or a UART-port.

3. The portable device according to claim 1, wherein:
said IC being mounted on a small printed circuit board PCB, and
said PCB is connected to at least one of a USB interface or a PCMCIA mechanical interface,
the device further comprising:
electronic surface components to support at least one of the USB mechanical interface and the PCMCIA mechanical interface being mounted on the same PCB,
a SDRAM chip, at least with 4 MB capacity, being mounted on the same PCB,
a non-volatile serial Flash chip, with at least 256 Kbytes capacity, being mounted on the same PCB, and
a fingerprint sensor being mounted on the same PCB;
wherein all preceding components and chips being protected inside a housing.

4. The portable device according to claim 3, wherein said housing is designed with a recess enabling a finger to be placed on, or swiped over the sensor being protected down in said recess, but still conveniently accessible by the finger.

5. The portable device according to claim 3, wherein:
said housing is equipped with a sliding lid enabling a finger to be placed on, or swiped over the sensor being protected under said sliding lid, but still conveniently accessible by the finger;

said sliding lid being forced into a closed position fully covering the sensor when the sliding lid is not pushed aside by a finger when a fingerprint image is to be captured;

a finger guide structure is placed adjacent to the sliding lid when the sliding lid is in closed position, fully covering the sensor, the finger guide intuitively guiding the finger in a correct position to open the sliding lid and thereby swipe the finger correctly over the sensor if the sensor is of a swipe type; and the UART interface on the IC supports the PCMCIA port.

6. The portable device according to claim 3, wherein:
said non-volatile memory is expanded with extra capacity beyond the 256 Kbytes minimum capacity, to provide extra storage capacity for data to enable the device to operate as a general portable data storage, and said IC is equipped with a USB mass storage class controller with at least one control endpoint and 2 bulk endpoints (in/out), to provide access to data onboard the portable device upon positive match of the captured fingerprint image with one of the fingerprint representations of authorized users stored onboard the portable device.

7. An embedded biometrics access device, comprising:
a device interface, being electronic or mechanical or both, for integration by embedment in a peripheral of, or within, a computer, and an integrated circuit (IC) providing increased security by bridging the functionality of fingerprint input from a user and fingerprint authentication to provide secure communication with the computer and at least one network connected thereto, said IC comprising:

a central processor communicating with the other on-chip components via a high speed bus, a secure internal non-volatile memory connected to the high-speed bus, wherein the non-volatile memory either stores all program code, administrative software, tailored security output responses and fingerprint representations in the form of compact fingerprint minutiae securely within the IC or is capable of storing encryption seeds for sensitive data stored on an external non-volatile memory, a first memory interface block connected to the high speed bus for interfacing with volatile memory and for providing working memory available to other modules on the integrated circuit, a second memory interface block connected to the high speed bus for interfacing with non-volatile memory, and for alternative storing of program code, administrative software, tailored security output responses, and fingerprint representations in the form of compact fingerprint minutiae, being encrypted internally in the IC by encryption seeds from an encryption block, a first interface block coupled to a fingerprint sensor, an image capture and pre-processing block connected to the first interface block, said image capture and pre-processing block being adapted to perform the initial processing of raw fingerprint images captured from the sensor into a dataset of reduced size, denoted intermediate fingerprint data, the intermediate fingerprint data being submitted as output to the central processor via the high speed bus for final processing to compact fingerprint minutiae on the central processor, one or more encryption modules connected to the high-speed bus for providing encryption information, or alternatively scrambling information, the central processor being adapted to apply the encryption information to the fingerprint data for producing secured data as an output to the high speed bus, and one or more second interface blocks for supplying the secured data to an external access-limited apparatus, device or system via the device interface.

8. The embedded access device according to claim 7, wherein the integrated circuit comprises hardware and software required to supply output signals to one or more of the second interface blocks, implemented in the form of a USB-port, a PCMCIA-port or a UART-port.

9. The embedded access device according to claim 7, wherein:

said IC is mounted on a small printed circuit board PCB, said IC is connected to the PCB by one or more of a USB, an Ethernet, a GPIO, a UART or a SmartCard interface on the IC, said PCB is equipped with a mechanical/electronic interface suitable for the host device, the device further comprising:

an SDRAM chip, with at least 4 MB capacity, being mounted on the same PCB, a non-volatile serial Flash chip, with at least 256 Kbytes capacity, being mounted on the same PCB, a fingerprint sensor being mounted on the same PCB, or mounted separately in a host device, and connected to the IC on the PCB by a cable.

10. A method for providing a bridge from biometrics input to a computer into secure communication protocol responses to a non-biometrics network, comprising a single integrated circuit (IC) executing the following steps:

capturing an image from a fingerprint sensor via a first interface block, pre-processing the captured fingerprint image in an image capture and pre-processing block, using hardware-embedded algorithms optimized for high-speed processing of raw fingerprint image data, into a dataset of reduced size, transferring the pre-processed dataset to a central processor for extracting compact fingerprint minutiae via a high-speed bus, retrieving, by the central processor, compact fingerprint minutiae from a non-volatile storage module holding pre-stored master compact fingerprint minutiae of authorized persons, comparing, in the central processor, the compact fingerprint minutiae of the captured fingerprint with the pre-stored master compact fingerprint minutiae, producing, in dependence of the result from the said comparison, a secure output in a pre-defined format to an external unit, network or system through one of a plurality of communication interfaces.

11. The method according to claim 10, further comprising pre-loading into the non-volatile memory a subset of the administrative software which tailors the output secure communication response to the target network or Intranet to a pre-defined format and sequence, including handshake sequences.

12. The method according to claim 11, wherein the output from the IC is blocked, via a non-authorized access state, if the matching by IC of the captured compact fingerprint minutiae is negative relative to all of the authorized compact fingerprint minutiae stored in the non-volatile memory.

13. The method according to claim 11, wherein the output from the IC is opened, via an authorized access state, if the matching by the IC of the captured compact fingerprint minutiae is positive relative to any of the authorized compact fingerprint minutiae stored in the non-volatile memory.

14. The method according to claim 11, wherein the pre-loaded subset of the administrative software can combine the steps of:

generating a pseudo-random secure key or password, applying any of the encryption methods at hand and embedded in the hardware blocks, such as DES, ECB, CBC, TDES, or any proprietary encryption algorithm also embedded in hardware, and tailoring handshake sequences according to the rules of secure communication of the device, network or system.

15. The method according to claim 11, wherein the pre-loaded subset of the administrative software is adapted to perform sequencing the operation of the respective functionality blocks of the IC in order to produce secured output data which is suitable for transmission in the targeted network and for processing by receiving units connected to the network.

16. The method according to claim 10, wherein secure communication parameters of a network or a device, including at least one of encryption seed, electronic certificates, PKI keys, and IP address of a targeted server or resident computer in a device are pre-stored during a personalization of the IC into either embedded SmartCard block or external SmartCard chip, or in scrambled format on external non-volatile memory.

17. The method according to clam 16, wherein:

said secure communication parameters can only be retrieved from the embedded SmartCard block or from the external SmartCard chip upon a positive match of the captured compact fingerprint minutiae relative to compact fingerprint minutiae of an authorized person, and an output signal from the IC including secure communication responses is initiated in dependence upon the result of a comparison of the captured compact fingerprint minutiae relative with compact fingerprint minutiae of an authorized person.

18. An embedded biometric access control device, comprising:

a biometric access device adapted to be embedded within a stand-alone appliance that uses an integrated circuit (IC) for bridging the functionality of fingerprint input from a user to secure communication with other parts of the said stand-alone appliance, said IC comprising:

a central processor communicating with the other on-chip components via a high speed bus, a secure internal non-volatile memory connected to the high-speed bus, wherein the non-volatile memory either stores all program code, administrative software, tailored security output responses and fingerprint representations in the form of compact fingerprint minutiae securely within the IC or is capable of storing encryption seeds for sensitive data stored on an external non-volatile memory, a first memory interface block connected to the high speed bus for interfacing with volatile memory and for providing working memory available to other modules on the integrated circuit, a second memory interface block connected to the high speed bus for interfacing with non-volatile memory, for alternative storing of program code, administrative software, tailored security output responses, and fingerprint representations in the form of compact fingerprint minutiae, being encrypted internally in the IC by encryption seeds from an encryption block, a first interface block coupled to a fingerprint sensor, an image capture and pre-processing block connected to said first interface block, said image capture and pre-processing block being adapted to perform the initial processing of raw fingerprint images captured from the sensor into a dataset of reduced size, denoted intermediate fingerprint data, the intermediate fingerprint data being submitted as output to the central processor via the high speed bus for final processing to compact fingerprint minutiae on the central processor, one or more encryption modules connected to the high-speed bus for providing encryption information, or alternatively scrambling information or for performing encryption or scrambling, the central processor being adapted to apply the encryption or scrambling information to the fingerprint data for producing secured data as an output to the high speed bus, and one or more second interface blocks for supplying the secured data to other modules of the stand-alone appliance.

19. The embedded access control device according to claim 18, further comprising:

fingerprint information non-volatile storage means, such as e.g. a SmartCard unit, for storing information related to the fingerprint characteristics of authorized users, fingerprint input means for entering the fingerprint characteristics of authorized users into non-volatile memory of the IC, and fingerprint verification means in the form of processing capability including biometrics software for checking the authenticity of a user trying to access the device.

20. The embedded access control device according to claim 18, further comprising:

a fingerprint storage module in which the device stores a series of consecutive fingerprint representations generated by the fingerprint sensor signal capturing and pre-processing block, movement analyzing means, in the form of a hardware or a software movement analyzing program module for analyzing the obtained series of fingerprint representations to obtain a measure of the omni-directional finger movements across the sensor in two dimensions, translation means in the form of a hardware or a software translation program module for analyzing and categorizing the omni-directional finger movements across the fingerprint sensor according to predefined sets of finger movement sequences including directional and touch/no-touch finger movement sequences, and a command table for translating the categorized finger movements into control signals whereby the translating means generates control signal for controlling the stand-alone appliance in response to the finger movements on the sensor.

21. The embedded access control device according to claim 18, wherein:

the operating and control software of the stand-alone appliance is loaded into the non-volatile memory block of the integrated circuit IC, and said operating and control software of the stand-alone appliance is executed by the central processor of the IC.

22. A method of secured access control and user input in stand-alone appliances having an embedded biometric access control device, the method comprising performing the following steps in an integrated circuit:

capturing an image from a fingerprint sensor via a first interface block, pre-processing the captured image in an image capture and pre-processing block using hardware-embedded algorithms optimized for high-speed processing of raw fingerprint image data, into a dataset of reduced size, transferring the pre-processed dataset to a central processor for extracting compact fingerprint minutiae via a high-speed bus, retrieving, by the central processor, compact fingerprint minutiae from a non-volatile storage module holding pre-stored master compact fingerprint minutiae of authorized persons, comparing, in the central processor, the captured compact fingerprint minutiae with features of the pre-stored master compact fingerprint minutiae, and producing, in dependence of the result from said comparison, a pre-defined secure output to other parts of the stand-alone appliance.

23. The embedded access control device according to claim 18, wherein said device implements secure access to various functions in an automobile, including door locks or engine ignition.

24. A biometrics security integrated circuit (IC) for biometrically authenticating individuals in a secure application comprising:

at least one memory interface block for interfacing with one or more external memories;

a first interface block coupled to a biometrics sensor;

an image capture and pre-processing block connected to the first interface block, said image capture and pre-processing block adapted to reduce raw biometric image data into a dataset of reduced size;

at least one non-volatile memory block;

a secure internal non-volatile memory capable of storing either program code, administrative software, tailored security output responses and fingerprint representations in the form of compact fingerprint minutiae or encryption seeds for sensitive data stored on an external non-volatile memory;

at least one encryption module, said at least one encryption module operable to encrypt and decrypt biometric data, secure applications messages, and other secret information; and one or more second interface blocks;

a central processor to process the reduced-size dataset, received over the high speed bus, into compact biometric characteristics, wherein the IC, under the control of the central processor executing instructions stored in the at least one non-volatile memory block and/or accessed through the at least one memory interface block, is operable to:

capture, process, and store compact biometric characteristics of at least one authorized individual;

capture and process compact biometric characteristics of an individual to be authenticated;

compare the compact biometric characteristics of an individual to be authenticated with stored compact biometric characteristics of the at least one authorized individual; and based on the result of said comparison, generate a secure authorized or not authorized message to the secure application and transmit said message through the one or more second interface blocks;

further wherein said compact biometric characteristics of the at least one authorized individual and other secret information are stored in the at least one non-volatile memory block and/or in encrypted form in an external memory where the encryption key for said encrypted form is stored only in the at least one non-volatile memory.

25. The biometrics security integrated circuit (IC) of claim 24, wherein:
the compact biometric characteristics are compact fingerprint minutiae;
the biometric data are fingerprint data;
the raw biometric image data are raw fingerprint image data; and
the biometrics sensor is a fingerprint sensor.

* * * * *